US011716921B2

(12) United States Patent
Karst et al.

(10) Patent No.: US 11,716,921 B2
(45) Date of Patent: Aug. 8, 2023

(54) METHOD OF A VARIABLE STEERING RESPONSE FOR DIFFERENT STEERING OPERATIONS OF A WORKING MACHINE AND SYSTEM THEREOF

(71) Applicant: DEERE & COMPANY, Moline, IL (US)

(72) Inventors: Austin J. Karst, Ottumwa, IA (US); Jason J. Wanner, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 344 days.

(21) Appl. No.: 17/011,029

(22) Filed: Sep. 3, 2020

(65) Prior Publication Data
US 2022/0061204 A1 Mar. 3, 2022

(51) Int. Cl.
*A01B 69/00* (2006.01)
*B62D 5/06* (2006.01)
*B62D 5/09* (2006.01)
*B62D 6/00* (2006.01)
*B62D 5/065* (2006.01)

(52) U.S. Cl.
CPC ............ *A01B 69/007* (2013.01); *B62D 5/065* (2013.01); *B62D 5/091* (2013.01)

(58) Field of Classification Search
CPC ........ B62D 5/091; B62D 5/065; A01B 69/007
See application file for complete search history.

(56) References Cited

U.S. PATENT DOCUMENTS

| 6,216,806 | B1 | 4/2001 | Toms |
| 7,308,964 | B2 | 12/2007 | Hara et al. |
| 8,496,256 | B2 | 7/2013 | Bebernes et al. |
| 8,831,851 | B2 | 9/2014 | Canuto et al. |
| 9,074,347 | B2 | 7/2015 | Vigholm et al. |
| 10,710,629 | B2 | 7/2020 | Morselli et al. |
| 2012/0323458 | A1* | 12/2012 | Futamura .............. B60T 8/1755 701/72 |
| 2016/0039452 | A1* | 2/2016 | Rotole .................. B62D 11/24 180/414 |
| 2017/0280626 | A1 | 10/2017 | Bertino |

\* cited by examiner

*Primary Examiner* — Adam D Tissot
(74) *Attorney, Agent, or Firm* — Taft Stettinius & Hollister LLP; Stephen F. Rost

(57) ABSTRACT

A steering system for controlling an agricultural machine having a pair of front wheels and a pair of rear wheels includes a controller, an operator steer input for communicating a steer command, a steer input sensor for detecting and outputting the steer command to the controller, a primary differential steering system for operably controlling the pair of front wheels, and a secondary steering system for operably controlling the pair of rear wheels. The secondary steering system includes a first actuator for controlling a first rear wheel and a second actuator for controlling a second rear wheel. The primary differential steering system is controlled based on the steer command. The controller outputs a control signal to operably actuate the first and second actuators at a non-linear steering gain rate as a function of the steer command.

21 Claims, 18 Drawing Sheets

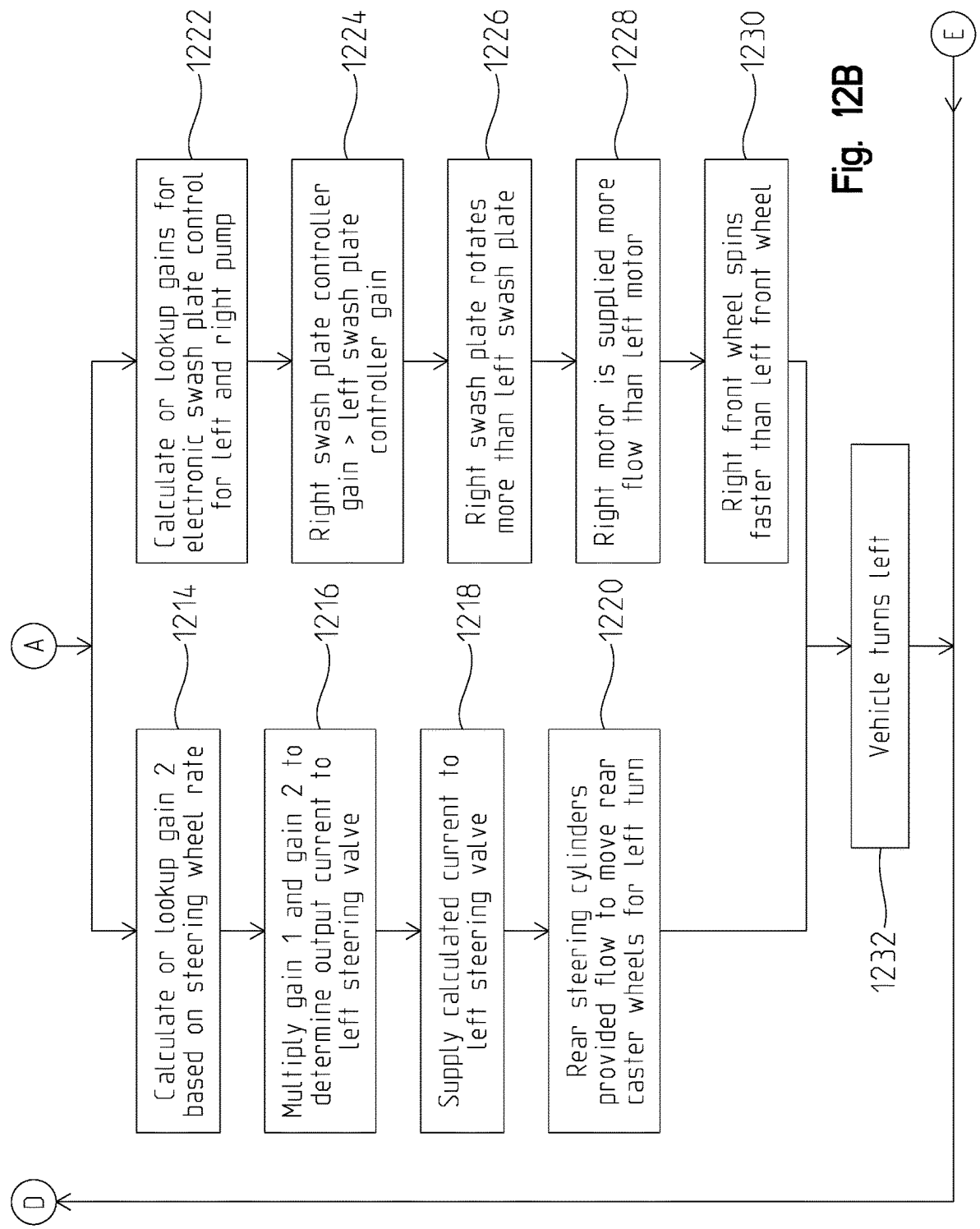

METHOD OF A VARIABLE STEERING RESPONSE FOR DIFFERENT STEERING OPERATIONS OF A WORKING MACHINE AND SYSTEM THEREOF

FIELD OF THE DISCLOSURE

The disclosure generally relates to a hydraulic system for controlling a pair of steerable rear caster wheels of an agricultural machine.

BACKGROUND

Some agricultural machines, such as but not limited to self-propelled windrowers, are driven through a dual-path hydrostatic system. Speed changes are made by adjusting the speed of both front drive wheels simultaneously. Primary steering or direction changes are made by adjusting the relative speed of the front drive wheels. Rear steering systems are also commonly used on agricultural machines including self-propelled windrows. The rear wheels of such machines may be caster wheels to allow the machine to pivot during direction changes.

Caster wheels are typically carried by a frame of the vehicle, and are free to rotate about a generally vertical axis three hundred sixty degrees (360°). The caster wheel assembly typically includes a shaft defining an axis of rotation, a fork rigidly attached to the bottom end of the shaft, and a caster wheel coupled with the distal ends of the fork.

In order to improve steerability of such vehicles, the vehicle may be equipped with a rear steering system for controlling the rear caster wheels in conjunction with a primary steering system to provide faster steering inputs while turning and improve the ability to hold a straight line. The system may also provide the capability to be inactive while allowing the rear wheels to move freely when subjected to ground inputs.

SUMMARY

In one embodiment of the present disclosure, a steering system for controlling an agricultural machine having a front traction mechanism (e.g., a pair of front wheels) and a pair of rear wheels, includes a controller; an operator steer input configured to be operably controlled by an operator to communicate a steer command; a steer input sensor in communication with the operator steer input and the controller, the steer input sensor configured to detect and output the steer command to the controller; a primary differential steering system for operably controlling the pair of front wheels; and a secondary steering system for operably controlling the pair of rear wheels, the secondary steering system comprising a first actuator for controlling a first rear wheel of the pair of rear wheels and a second actuator for controlling a second rear wheel of the pair of rear wheels; wherein, the controller outputs a first control signal to operably control the primary differential steering system based on the steer command; wherein, the controller outputs a second control signal to operably actuate the first and second actuators at a non-linear steering gain rate as a function of the steer command.

In one example of this embodiment, the first and second actuators are operably controlled independently from one another. In a second example, the first and second actuators comprise electric actuators. In a third example, the primary differential steering system includes a first pump and a first motor for operably controlling a first front wheel of the pair of front wheels; a second pump and a second motor for operably controlling a second front wheel of the pair of front wheels; a steering actuator disposed in communication with the controller; and a mechanical mechanism for varying a displacement of the first and second pumps based on the first control signal. In a fourth example, the primary differential steering system includes a first pump and a first motor for operably controlling a first front wheel of the pair of front wheels; and a second pump and a second motor for operably controlling a second front wheel of the pair of front wheels; wherein, the controller determines a gain for an electronic swash plate control for each of the first and second pumps; further wherein, the first control signal comprises a first portion of flow to the first motor and a second portion of flow to the second motor as a function of the gain.

In a fifth example of this embodiment, the first control signal comprises a linear steering gain rate as a function of the steer command. In a sixth example, the first control signal comprises a non-linear steering gain rate as a function of the steer command. In a seventh example, the non-linear steering gain rate comprises a plurality of ramps of varying slope. In an eighth example, an operator gain input disposed in communication with the controller, the operator gain input configured to be operably controlled by an operator to select one of a plurality of non-linear steering gain rates for controlling the secondary steering system, wherein each of the plurality of non-linear steering gain rates outputs a different gain value as a function of the steering command.

In a further example, the rear steering system comprises a hydraulic system having a pressure source configured to supply a flow of pressurized fluid; a tank configured to receive the fluid and supply the fluid to the pressure source; a first steering command valve and a second steering command valve; a first steering fluid circuit interconnecting the first actuator and the first steering command valve in fluid communication; and a second steering fluid circuit interconnecting the second actuator and the second steering command valve in fluid communication; wherein, the steer command comprises a steer direction and a steer rate; wherein, the second control signal is supplied to the first or second steering command valve based on the steer rate to induce a steering motion of the first or second rear wheel.

In another embodiment of the present disclosure, a method of controlling a steering motion of an agricultural machine includes providing the agricultural machine with a controller, a steering wheel, a steer input sensor, a machine speed sensor, a prime mover for propelling the machine in a travel direction, a primary differential steering system for operably controlling a pair of front wheels, and a secondary steering system comprising a first actuator for controlling a first rear wheel and a second actuator for controlling a second rear wheel; detecting a machine speed with the machine speed sensor and a position of the steering wheel with the steer input sensor; determining a first gain value as a function of the machine speed; determining a steer command from the position of the steering wheel, the steer command comprising a first steer direction and a first steer rate; determining a second gain value based on the steer command; calculating a control signal based on the first gain value and the second gain value; outputting the control signal to a steering valve of the secondary steering system, wherein the control signal comprises a non-linear steering gain as a function of the steer command; actuating the first and second actuators based on the control signal; and operably controlling the first and second rear wheels to cause the steering motion of the agricultural machine.

In a first example of this embodiment, the method includes providing hydraulic fluid to a steering cylinder of the primary differential steering system; rotating a mechanical mechanism of the primary differential steering system based on the amount of hydraulic fluid provided to the steering cylinder; directing a first amount of fluid flow to a first motor of the primary differential steering system and a second amount of fluid flow to a second motor of the primary steering system; and rotating a first front wheel of the pair of front wheels by the first motor and a second front wheel of the pair of front wheels by the second motor; wherein, the first front wheel rotates faster than the second front wheel.

In a second example, the method includes providing the primary differential steering system with a first pump and a second pump; changing a displacement of the first pump or second pump based on the steer command; supplying the first amount of fluid flow from the first pump to the first motor; and supplying the second amount of fluid flow from the second pump to the second motor. In a third example, the method includes providing the differential steering system with a first pump, a first electric motor, a second pump, and a second electric motor; determining a gain for a first electronic swash plate control of the first pump and a second electronic swash plate control of the second pump; supplying more flow to the first electric motor than the second electric motor; and rotating a first front wheel of the pair of front wheels by the first electric motor and a second front wheel of the pair of front wheels by the second electric motor, where the first front wheel rotates faster than the second front wheel.

In a fourth example of the present embodiment, the method includes outputting a second control signal to the primary differential steering system, wherein the second control signal comprises a linear steering gain rate as a function of the steer command. In a fifth example, the method includes outputting a second control signal to the primary differential steering system, wherein the second control signal comprises a non-linear steering gain rate as a function of the steer command. In a sixth example the non-linear steering gain rate comprises a plurality of ramps of varying slope as a function of the steer command. In a seventh example, the method includes providing a plurality of non-linear steering gain rates as a function of a steering wheel rate, where each of the plurality of non-linear steering gain rates outputs a different gain value at a discrete steering wheel rate; receiving a command by the controller from an operator gain input corresponding to a selection of a first of the plurality of non-linear steering gain rates; and outputting the control signal to the secondary steering system based on the first non-linear steering gain rate.

In a further embodiment of the present disclosure, a steering system for controlling an agricultural machine includes a control system comprising a controller, an operator steer input configured to be operably controlled by an operator to communicate a steer command, a steer input sensor in communication with the operator steer input and the controller, the steer input sensor configured to detect and output the steer command to the controller; and an operator gain input configured to be operably controlled by the operator to select from a plurality of non-linear steering gain curves as a function of steer command; a primary differential steering system for operably controlling the pair of front wheels, the primary differential steering system comprising a first pump and a first motor for operably controlling a first front wheel and a second pump and a second motor for operably controlling a second front wheel; and a secondary steering system for operably controlling a first rear wheel and a second rear wheel, the secondary steering system comprising a first actuator for controlling the first rear wheel and a second actuator for controlling the second rear wheel; wherein, the controller outputs a first control signal to operably control the primary differential steering system based on the steer command; further wherein, the controller outputs a second control signal to operably actuate the first and second actuators based on a selected non-linear steering gain curve from the plurality of non-linear steering gain curves.

In one example of this embodiment, the steer command comprises at least a steering wheel rate; the first control signal corresponds to a first non-linear gain curve; the first non-linear gain curve and the selected non-linear steering gain curve provide overlapping gain values at a low steering wheel rate; and the selected non-linear steering gain curve providing a higher gain value than the first non-linear gain curve at a high steering wheel rate.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIGS. 12A-C is another flow diagram of a method of controlling a front and rear steering system of the agricultural machine of FIG. 1;

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
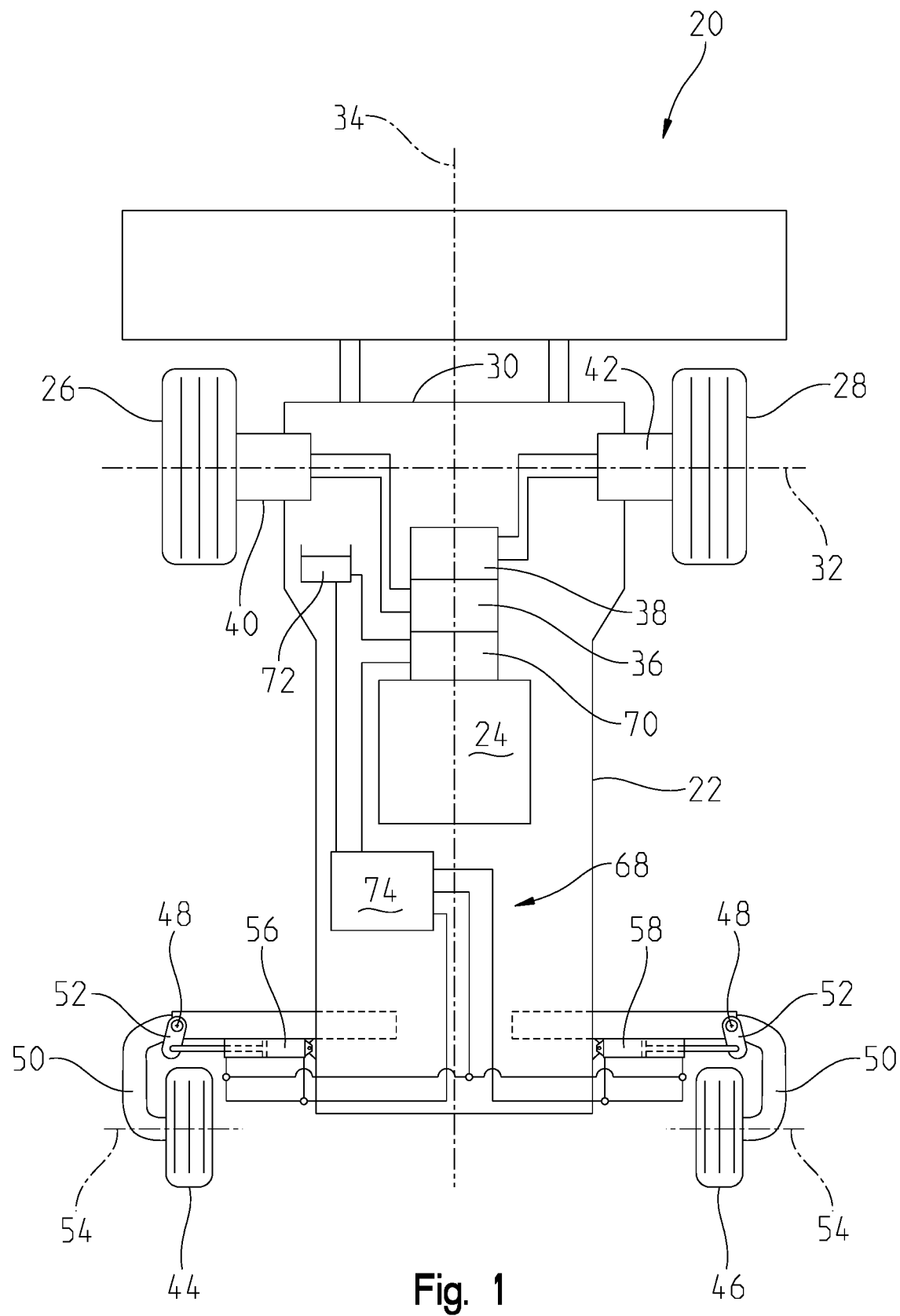
FIG. 1 is a schematic plan view of an agricultural machine.

Referring to the Figures, wherein like numerals indicate like parts throughout the several views, an agricultural machine is generally shown at 20 in FIG. 1. The example embodiment of the agricultural machine 20 shown in FIG. 1 includes, but is not limited to, a self-propelled windrower. However, it should be appreciated that the teachings of this disclosure may be applied to machines other than the windrower depicted in FIG. 1.

Referring to FIG. 1, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end 30 of the frame 22. The left front drive wheel 26 and the right front drive wheel 28 are rotatable about a transverse axis 32. The transverse axis 32 is generally perpendicular to a longitudinal axis 34 of the frame 22. The left front drive wheel 26 and the right front drive wheel 28 may form a front traction mechanism. In an alternative embodiment, the pair of front drive wheels may be replaced by a pair of tracks thus forming the traction mechanism. For sake of the illustrated embodiment of FIG. 1, however, the front traction mechanism will be described as including a pair of front drive wheels.

A first drive pump 36 and a second drive pump 38 are coupled to and driven by the prime mover 24. The first drive pump 36 supplies pressurized fluid to a first hydraulic motor 40. The first hydraulic motor 40 is coupled to the left front drive wheel 26 and operable to rotate the left front drive wheel 26 to propel the agricultural machine 20. The second drive pump 38 supplies pressurized fluid to a second hydraulic motor 42. The second hydraulic motor 42 is coupled to the right front drive wheel 28 and operable to rotate the right front drive wheel 28 to propel the agricultural machine 20. In this embodiment, the left and right front drive wheels 26, 28 are rotatably driven by independent closed-loop system including the aforementioned pump and motor.

As understood by those skilled in the art, the left front drive wheel 26 and the right front drive wheel 28 may be simultaneously rotated in the same rotational direction and at the same rotational speed about the transverse axis 32 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 32, or in opposite rotational directions at the same or different rotational speeds about the transverse axis 32, in order to turn the agricultural vehicle.

Moreover, the first drive pump 36 and the second drive pump 38 may be operably controlled by a controller 302 (see FIG. 3) to alter the displacement thereof to achieve differential steering in the front steering system. The displacement of each pump may be changed simultaneously or at different times. Further, the displacement may be varied at different rates to induce a steering motion.

The front or primary differential steering system may be controlled in one of a plurality of ways. First, the differential steering at the drive pumps may be controlled by a mechanical mechanism such as a wishbone (not shown). When an operator turns a steering wheel or other operator steering input (OSI) 304 (see FIG. 4), hydraulic flow is diverted to an actuator (not shown) which actuates in a certain direction. As this happens, the mechanical mechanism rotates which induces differential swash plate angles of the pumps and results in a steering motion.

A second example is an electrical control system. Here, the controller 302 or other controller may control a valve electronically to induce a steering motion. In yet another example, an electro-hydraulic control system may be used where the aforementioned mechanical mechanism is removed and electronic signals may be sent to an electronic displacement controller which will control the swash plate angle independently upon the control signal.

While the embodiment of FIG. 1 illustrates a hydraulic control system for the front differential steering system, it is further possible for the first and second drive pumps to be removed and the first and second hydraulic motors be replaced by electric motors. The electric motors may be independently controlled by a controller to vary speed and such to control a steering motion of the agricultural machine 20.

Due to the mass of the machine 20, there can be steering lag at the front drive wheels. To improve upon this lag, the agricultural machine may include a rear steering system which can steer a rear axle of the machine. Referring to FIG. 1, the agricultural machine 20 further includes a left rear caster wheel 44 and a right rear caster wheel 46 attached to the frame 22. As used herein, the term "caster wheel" should be understood to include a wheel that is able to rotate a full three hundred sixty degrees (360°) about a respective generally vertical axis 48. As such, each of the left rear caster wheel 44 and the right rear caster wheel 46 are rotatable a full three hundred sixty degrees (360°) about a respective generally vertical axis 48.

The left rear caster wheel 44 and the right rear caster wheel 46 may be attached to the frame 22 in a suitable manner. For example, as shown in FIG. 1, the caster wheels may be attached to the frame 22 via an arm 50. The arm 50 includes an upper shaft 52 that is rotatable about the generally vertical axis 48. The caster wheel is attached to lower distal end of the arm 50. Typically, a generally horizontal axis 54 of rotation of the wheel is longitudinally offset from the generally vertical axis 48, such that the caster wheel tends to follow behind the generally vertical axis 48. It should be appreciated that the right rear caster wheel 46 and the left rear caster wheel 44 may be attached to the frame 22 in some other manner than described herein.

Figure 2:
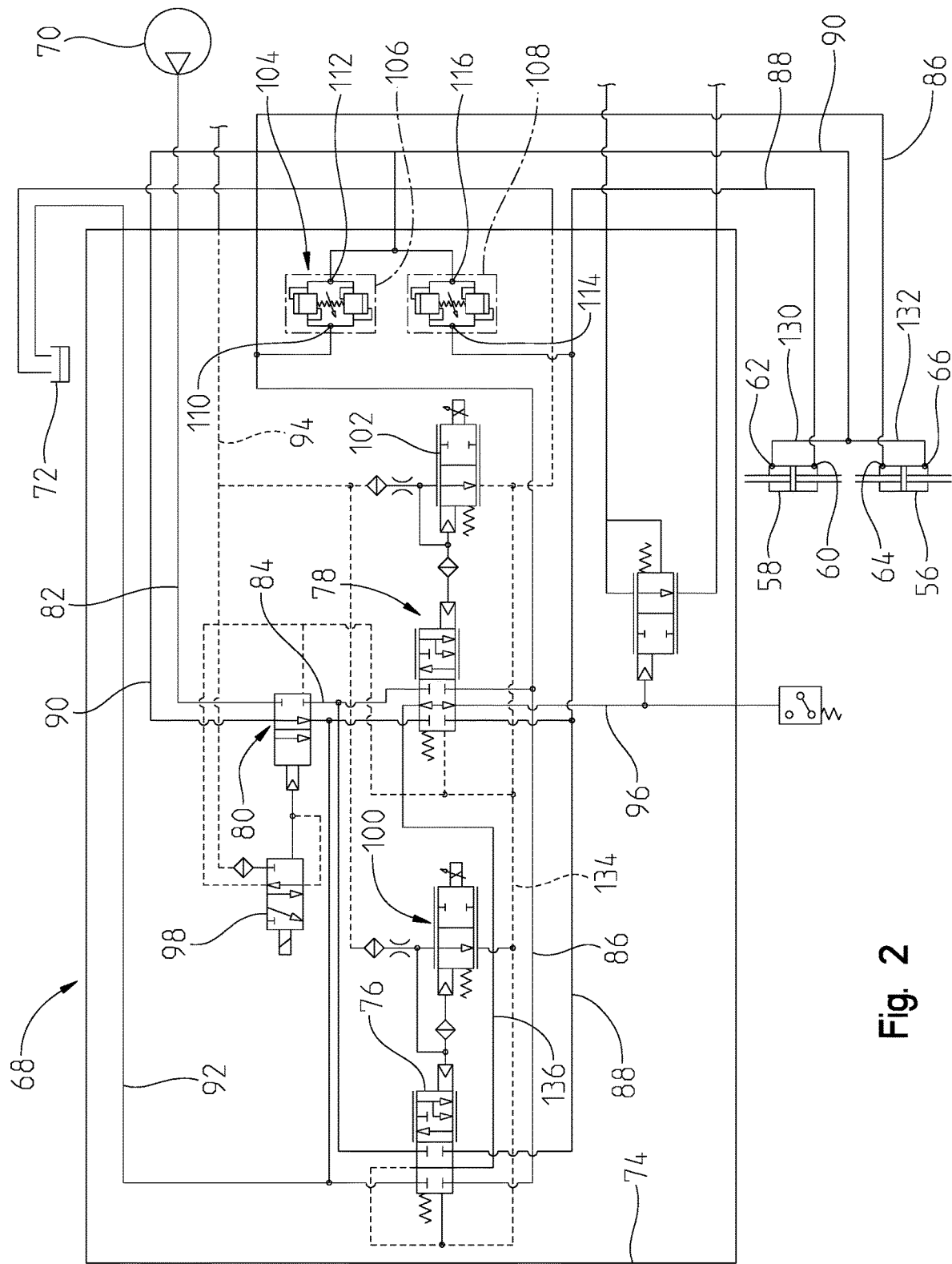
FIG. 2 is a schematic layout of a hydraulic system of the agricultural machine.

A left side actuator 56 interconnects the left rear caster wheel 44 and the frame 22, and is configured to control a position of the left rear caster wheel 44. Similarly, a right side actuator 58 interconnects the right rear caster wheel 46 and the frame 22, and is configured to control a position of the right rear caster wheel 46. In the example embodiment shown in FIG. 1 and described herein, each of the right side actuator 58 and the left side actuator 56 include a double acting hydraulic cylinder. As such, and as shown in FIG. 2, the right side actuator 58 includes an inboard port 60 and an outboard port 62 for receiving or discharging hydraulic fluid. Similarly, the left side actuator 56 includes an inboard port 64 and an outboard port 66 for receiving or discharging hydraulic fluid.

The agricultural machine 20 includes a hydraulic system for controlling the pair of steerable caster wheels, i.e., the left rear caster wheel 44 and the right rear caster wheel 46. While the left front drive wheel 26 and the right front drive wheel 28 provide the primary steering for the agricultural machine 20, the left rear caster wheel 44 and the right rear caster wheel 46 may be controlled to provide a steering assist and/or improve steering responsiveness under certain operating conditions. The hydraulic system connects the left side actuator 56 and the right side actuator 58 to provide a fluid tie rod therebetween. In other words, under certain operating conditions, the operation of the left rear caster wheel 44 and the right rear caster wheel 46 may be coupled together to provide a steering force to the agricultural machine 20, while in other operating conditions, the operation of the left rear caster wheel 44 and the right rear caster wheel 46 may be de-coupled to provide independent operation. Additionally, the hydraulic system allows hydraulic forces applied to the left side actuator 56 and the right side actuator 58 to be overcome or overridden by forces applied to the left rear caster wheel 44 and the right rear caster wheel 46 by the ground.

The hydraulic system includes a pressure source 70 configured to supply a flow of pressurized fluid. The pressure source 70 may include, but is not limited to, an auxiliary fluid pump that is drivenly coupled to the prime mover 24. The pressure source 70 draws fluid from a tank 72, and circulates the fluid through the hydraulic system 68. The tank 72 receives the fluid from the hydraulic system, stores the fluid, and supplies the fluid to the pressure source 70, e.g., an auxiliary fluid pump shown in FIG. 1.

Referring to FIG. 2, the hydraulic system 68 is shown schematically using standard American National Standards Institute (ANSI) hydraulic symbols to represent the various components of the example hydraulic system 68 therein. The hydraulic system 68 includes the pressure source 70 and the tank 72 described above, in combination with a valve block 74 and a plurality of fluid circuits described in greater detail below. It should be appreciated that the various fluid circuits described herein are defined fluid pathways or passages defined by the valve block 74, hard lines, flexible lines, fittings, connections, etc., that connect the various components and direct the fluid between components.

The valve block 74 includes a left steering command valve 76, a right steering command valve 78, and a rear steering control valve 80. A supply pressure fluid circuit 82 interconnects the pressure source 70 and the rear steering control valve 80 in fluid communication. A command valve supply fluid circuit 84 interconnects the rear steering control valve 80 with both the right steering command valve 78 and the left steering command valve 76 in fluid communication. A left side steering fluid circuit 86 interconnects the left side actuator 56 and the left steering command valve 76 in fluid communication. A right side steering fluid circuit 88 interconnects the right side actuator 58 and the right steering command valve 78 in fluid communication. A fluidic tie rod fluid circuit 90 interconnects both the left side actuator 56 and the right side actuator 58 with the rear steering control valve 80 in fluid communication. A tank return fluid circuit 92 interconnects the rear steering control valve 80, the left steering command valve 76, the right steering command valve 78, and the tank 72 in fluid communication. A pilot supply fluid circuit 94 is disposed in fluid communication with the left steering command valve 76, the right steering command valve 78, and the rear steering control valve 80. A pilot return fluid circuit 134 is disposed in fluid communication with the left steering command valve 76, the right steering command valve 78, the rear steering control valve 80, and the tank 72. A cross-valve fluid circuit 136 interconnects the left steering command valve 76 and the right steering command valve 78 in fluid communication. A pressure sensor fluid circuit 96 is disposed in fluid communication with the right steering command valve 78.

The rear steering control valve 80 is controllable between a first state and a second state. When the rear steering control valve 80 is disposed in the first state, the fluidic tie rod fluid circuit 90 and the tank return fluid circuit 92 are connected in fluid communication and the supply pressure fluid circuit 82 and the command valve supply fluid circuit 84 are disconnected from fluid communication. When the rear steering control valve 80 is disposed in the second state the fluidic tie rod fluid circuit 90 and the tank return fluid circuit 92 are disconnected from fluid communication and the supply pressure fluid circuit 82 and the command valve supply fluid circuit 84 are connected in fluid communication. The rear steering control valve 80 is normally disposed in the first state and is controlled into the second state in response to an activation signal. The activation signal causes the rear steering control valve 80 to move from the first state to the second state. In the absence of the activation signal, the rear steering control valve 80 returns to or maintains its position in the first state.

The activation signal for the rear steering control valve 80 may include an input that is capable of moving the rear steering control valve 80 from the first state into the second state. For example, the activation signal for the rear steering control valve 80 may include, but is not limited to, a fluid signal, a pneumatic signal, an electronic signal, a mechanical signal, etc. In the example embodiment shown in FIG. 2, the rear steering control valve 80 is a pilot actuated position control valve, in which a dedicated pilot valve 98 is disposed in fluid communication with the pilot supply fluid circuit 94 and is operable in response to an electronic signal to provide a hydraulic activation signal to the rear steering control valve 80 to move the rear steering control valve 80 from its first position to its second position. It should be appreciated that the rear steering control valve 80 and the manner of actuating the rear steering control valve 80 may differ from the example embodiment depicted in FIG. 2 and described herein.

As shown in the example embodiment of FIG. 2, the left steering command valve 76 may include a pilot actuated variable directional control valve. The left steering command valve 76 is moveable between a first state, a second state, and a plurality of positions between the first state and the second state. When the left steering command valve 76 is disposed in the first state, the left steering command valve 76 is configured to disconnect fluid communication between the left side steering fluid circuit 86 and the tank return fluid circuit 92, connect fluid communication between the pilot return fluid circuit 134 and the cross-valve fluid circuit 136, and disconnect fluid communication between the command valve supply fluid circuit 84 and the right side steering fluid circuit 88. When the left steering command valve 76 is disposed in the second state, the left steering command valve 76 is configured to connect fluid communication between the left side steering fluid circuit 86 and the tank return fluid circuit 92, close fluid communication to the pilot return fluid circuit 134, and connect fluid communication between the command valve supply fluid circuit 84 with both the right side steering fluid circuit 88 and the cross-valve fluid circuit 136. The left steering command valve 76 is normally disposed in the first state and is controlled into the second state or a position between the first state and the second state in response to a variable activation signal. The variable activation signal causes the left steering command valve 76 to move from the first state into the second state or to a desired position between the first state and the second state. In the absence of the activation signal, the left steering command valve 76 returns to and/or maintains its position in the first state.

The variable activation signal for the left steering command valve 76 may include an input that is capable of moving the left steering command valve 76 from the first state into the second state or to a position between the first state and the second state. For example, the variable activation signal for the left steering command valve 76 may include, but is not limited to, a variable fluid signal, a variable pneumatic signal, a variable electronic signal, a variable mechanical signal, etc. In the example embodiment shown in FIG. 2, the left steering command valve 76 is a variable pilot actuated variable position control valve, in which a dedicated variable pilot valve 100 is disposed in fluid communication with the pilot supply fluid circuit 94 and is operable in response to an electronic signal to provide a variable hydraulic activation signal to the left steering command valve 76 to move the left steering command valve 76 from its first position to its second position or a position between its first position and its second position. It should be appreciated that the left steering command valve 76 and the manner of actuating the left steering command valve 76 may differ from the example embodiment depicted in FIG. 2 and described herein.

As shown in the example embodiment of FIG. 2, the right steering command valve 78 may include a pilot actuated variable directional control valve. The right steering command valve 78 is moveable between a first state, a second state, and a plurality of positions between the first state and the second state. When the right steering command valve 78 is disposed in the first state, the right steering command valve 78 is configured to disconnect fluid communication between the right side steering fluid circuit 88 and the tank return fluid circuit 92, connect fluid communication between the cross-valve fluid circuit 136 and the pressure sensor fluid circuit 96, and disconnect fluid communication between the command valve supply fluid circuit 84 and the left side steering fluid circuit 86. When the right steering command valve 78 is disposed in the second state, the right steering command valve 78 is configured to connect fluid communication between the right side steering fluid circuit 88 and the tank return fluid circuit 92, disconnect fluid communication to the cross-valve fluid circuit 136, and connect fluid communication between the command valve supply fluid circuit 84 and both the left side steering fluid circuit 86 and the pressure sensor fluid circuit 96. The right steering command valve 78 is normally disposed in the first state and is controlled into the second state or a position between the first state and the second state in response to a variable activation signal. The variable activation signal causes the right steering command valve 78 to move from the first state into the second state or to a desired position between the first state and the second state. In the absence of the activation signal, the right steering command valve 78 returns to and/or maintains its position in the first state.

The variable activation signal for the right steering command valve 78 may include an input that is capable of moving the right steering command valve 78 from the first state into the second state or to a position between the first state and the second state. For example, the variable activation signal for the right steering command valve 78 may include, but is not limited to, a variable fluid signal, a variable pneumatic signal, a variable electronic signal, a variable mechanical signal, etc. In the example embodiment shown in FIG. 2, the right steering command valve 78 is a variable pilot actuated variable position control valve, in which a dedicated variable pilot valve 102 is disposed in fluid communication with the pilot supply fluid circuit 94 and is operable in response to an electronic signal to provide a variable hydraulic activation signal to the right steering command valve 78 to move the right steering command valve 78 from its first position to its second position or a position between its first position and its second position. It should be appreciated that the right steering command valve 78 and the manner of actuating the right steering command valve 78 may differ from the example embodiment depicted in FIG. 2 and described herein.

The hydraulic system 68 further includes a cross port pressure relief system 104 that interconnects the left side steering fluid circuit 86, the right side steering fluid circuit 88, and the fluidic tie rod fluid circuit 90 in fluid communication. As shown in the example embodiment of FIG. 2, the cross port pressure relief system 104 includes a left side pressure relief valve 106 and a right side pressure relief valve 108. The left side pressure relief valve 106 includes a first port 110 connected in fluid communication to the left side steering fluid circuit 86, and a second port 112 connected in fluid communication to the fluidic tie rod fluid circuit 90. The right side pressure relief valve 108 includes a first port 114 connected in fluid communication to the right side steering fluid circuit 88, and a second port 116 connected in fluid communication to the fluidic tie rod fluid circuit 90. The second port 112 of the left side pressure relief valve 106 and the second port 116 of the right side pressure relief valve 108 are both connected in fluid communication to each other, and to the fluidic tie rod fluid circuit 90. In the example shown in FIG. 2, the left side pressure relief valve 106 and the right side pressure relief valve 108 are disposed in the valve block 74. However, in other embodiments, the left side pressure relief valve 106 and the right side pressure relief valve 108 may be disposed in another or different valve body.

The left side pressure relief valve 106 and the right side pressure relief valve 108 provide two-way pressure relief. In other words, regardless of which direction the fluid pressure is applied from, i.e., from the first ports 110, 114 to the second ports 112, 116 respectively or from the second ports 112, 116 to the first ports 110, 114 respectively, the left side pressure relief valve 106 and the right side pressure relief valve 108 are configured to allow fluid communication when the applied fluid pressure is greater than a defined limit.

The left side steering fluid circuit 86 is disposed in fluid communication with the inboard port 64 of the left side actuator 56. A left side line 132 is disposed in fluid communication with the outboard fluid port 66 of the left side actuator 56. The right side steering fluid circuit 88 is disposed in fluid communication with the inboard port 60 of the right side actuator 58. A right side line 130 is disposed in fluid communication with the outboard fluid port 62 of the right side actuator 58. The right side line 130 and the left side line 132 are connected to each other and to the fluidic tie rod fluid circuit 90 in fluid communication.

The flow of hydraulic fluid to each of the left side actuator 56 and the right side actuator 58 can be varied proportionally which will change the rate at which the agricultural machine 20 steers. For instance, if the operator desires to make a minor steering correction, either the left or right steering command valve 76, 78 may be controlled partially open. If, however, the operator needs to make a quick, aggressive steering motion, either steering command valve may be opened more fully to increase the flow of hydraulic fluid to either the left side actuator 56 or the right side actuator 58. Each actuator may be controlled independent of the other.

Although the rear steering system has been described above as being a hydraulic system, it is also possible that the rear steering system may be controlled electrically. For instance, the left side actuator 56 and the right side actuator 58 may be electric actuators which are variably controlled by a controller. Moreover, the rear steering system may include actuators that communicate with each other via means of an electrical, mechanical, or hydraulic control signal.

The rear steering system may be active or passive. When passive, there may be no input into the system dynamics. The rear actuators, for example, may provide damping by varying the resistance (i.e., the opening size) to the rear caster wheels.

Figure 3:
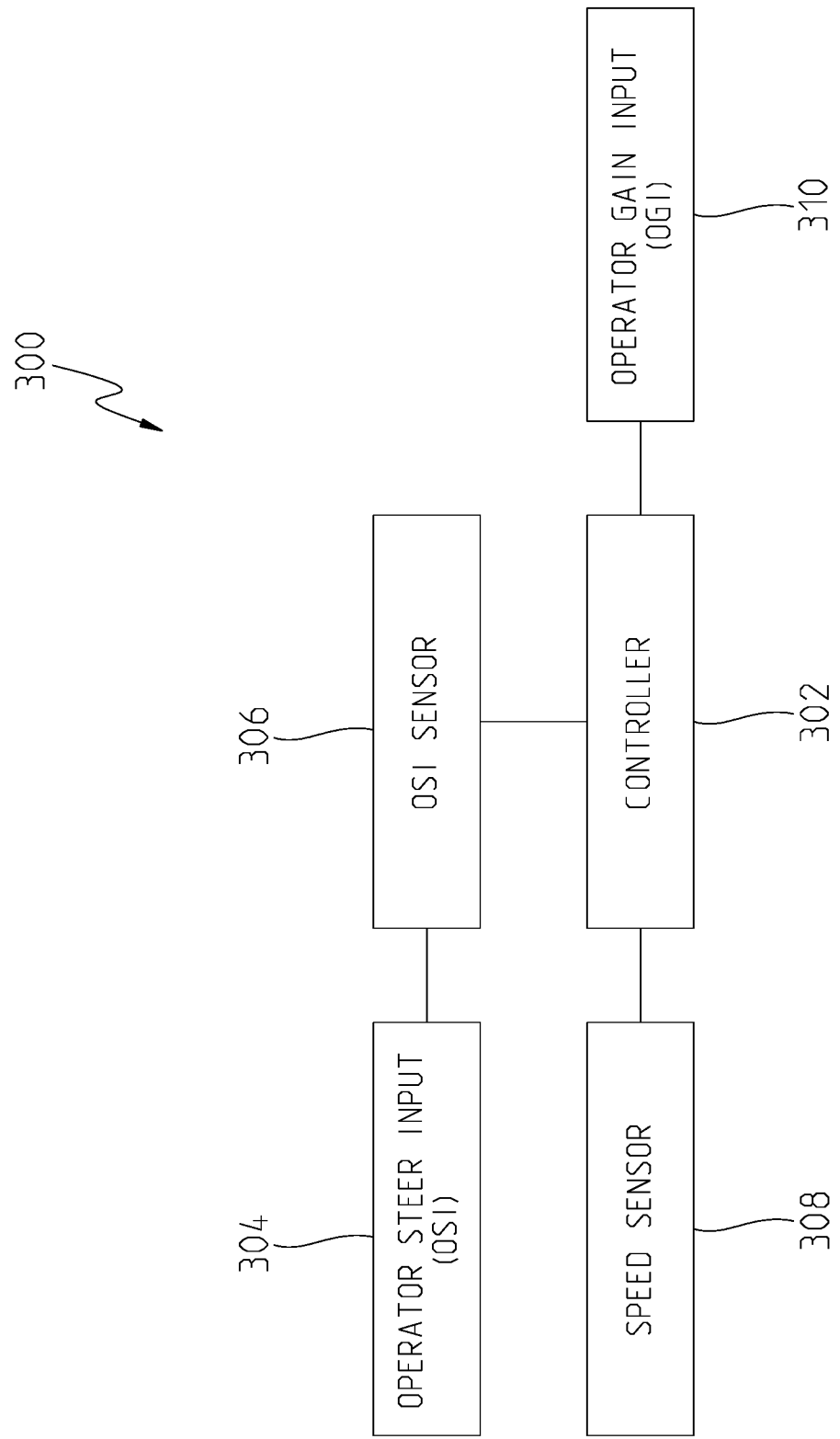
FIG. 3 is a schematic layout of a control system of the agricultural machine.

Referring to FIG. 3, one embodiment of a control system 300 of the agricultural machine 20 of FIG. 1 is shown. The control system 300 may include a controller 302 as previously described. The controller 302 may comprise more than one controller. For example, the controller 302 may include a vehicle controller, an engine or prime mover controller, a transmission controller, a motor controller, a pump controller, a front or primary steering system controller, a rear or secondary steering system controller, an electronic displacement controller, and the like. Thus, the controller 302 may include one or more controllers for controlling the operation of the machine 20.

An operator of the machine 20 may operably control an operator steer input (OSI) 304 such as a steering wheel, joystick, etc. As the operator controls the OSI 304, an OSI sensor 306 may detect movement of the OSI. For instance, an operator may turn a steering wheel in a right, clockwise direction. The OSI sensor 306 may be coupled to a steering column of the steering wheel, detect the movement of the steering wheel 304, and communicate the movement and how fast the steering wheel is being turned to the controller 302.

The operator steer input 304 may be located in an operator's cab of the machine 20. The operator steer input 304 may be one of a plurality of operator controls for controlling operation of the machine 20. In addition, an operator gain input (OGI) 310 may also be located in the cab and disposed in communication with the controller 302. The OGI 310 may be displayed on a display screen or other location for the operator to access. The OGI 310 allows an operator to adjust a gain value of the respective left steering command valve 76 and right steering command valve 78 to control fluid flow to the respective actuator. The gain value may be varied to adjust the sensitivity of the gain. For instance, a higher gain will provide more fluid to the actuators, whereas a lower gain value will provide less flow to the actuators. These operator inputs may be communicated via the OGI 310 to the controller 302.

As also shown in FIG. 3, a speed sensor 308 may be in electronic communication with the controller 302. The speed sensor 308 may provide an input of machine speed to the controller 302. This will be described in further detail below.

Figure 4:
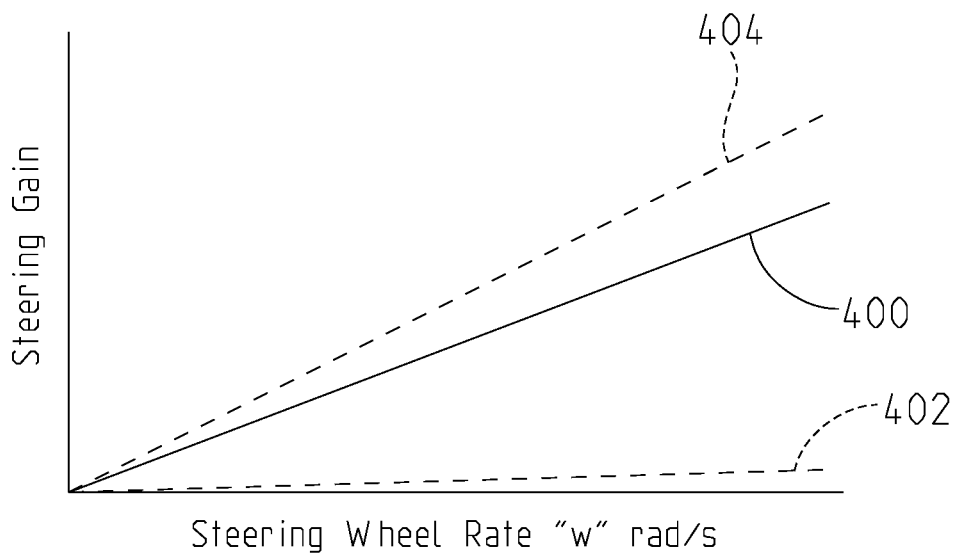
FIG. 4 is a graphical illustration of conventional gain curves of a front hydro differential steering system and a rear steering system.

During a steering maneuver the controller 302 may send a command current that can be varied to one of the command valves to provide the respective hydraulic actuator with fluid at a given flow rate. A second mechanical mechanism or control signal may also provide input into the front or primary steering system when the operator gives a steering input via the OSI 304. In FIG. 4, a graphical illustration is provided of a conventional control system outputting a steering gain as a function of steering wheel rate. The illustration includes a first curve 400 representing a linear relationship between the steering gain of the front or primary steering system and the steering wheel rate (e.g., how fast an operator may turn a steering wheel). A second curve 402 represents a first linear relationship between the steering gain of the rear steering system and steering wheel rate, and a third curve 404 represents a second linear relationship between the steering gain of the rear steering system and steering wheel rate. As the steering gain increases, increased flow is provided to the steering actuators 56, 58 which results in a faster steering response.

In the curves of FIG. 4, each is linear and increases as steering wheel rate increases. The second curve 402 may represent a lower gain sensitivity and the third curve 404 may represent a higher gain sensitivity for controlling the rear steering system. In the conventional control system illustrated in FIG. 4, the system includes the ability to change the rear steering gains to adjust the sensitivity of the overall steering system to fit an operator's driving preference. This is shown better in FIG. 5 where three different rear steering variable gain curves are provided. A first curve 500 may be a low sensitivity where the gain does not increase substantially as the steering wheel rate increases. A second curve 502 may be a medium sensitivity curve for an average comfort setting for an operator. Here, the slope of the second curve 502 is greater than the first curve 500 so that there is less lag time at higher steering wheel rates. A third curve 504 has a much greater linear slope than the first and second curves so that the gain is much greater at the higher steering wheel rates. Conventionally, an operator selects one of these sensitivity levels so that a gain value is output based on the steering wheel rate.

The problem with the conventional design is that when the variable rear steering gain is increased towards a maximum setting (e.g., gain curve 504), the steering response can feel "jerky" when making steering adjustments. This can be evident to operators in particular when making slow and small adjustments to maintain a straight line or when making large but rapid adjustments when avoiding an obstacle.

To overcome these disadvantages, the present disclosure provides various embodiments for improving vehicle steering and handling characteristics by implementing a blended, non-linear control logic to change the handling characteristics between slow and rapid steering wheel inputs. This proposed solution provides gentle secondary steering inputs while making small steering corrections to maintain a straight line while the vehicle is moving in the forward direction. The control logic allows for aggressive secondary steering inputs when the operator makes rapid steering maneuvers for operations such as avoiding an obstacle. With this new system, an operator may experience an overall decrease in steering lag time, improved comfort level for centerline handling operations, and improved controllability for aggressive maneuvers and return to straight line.

Figure 5:
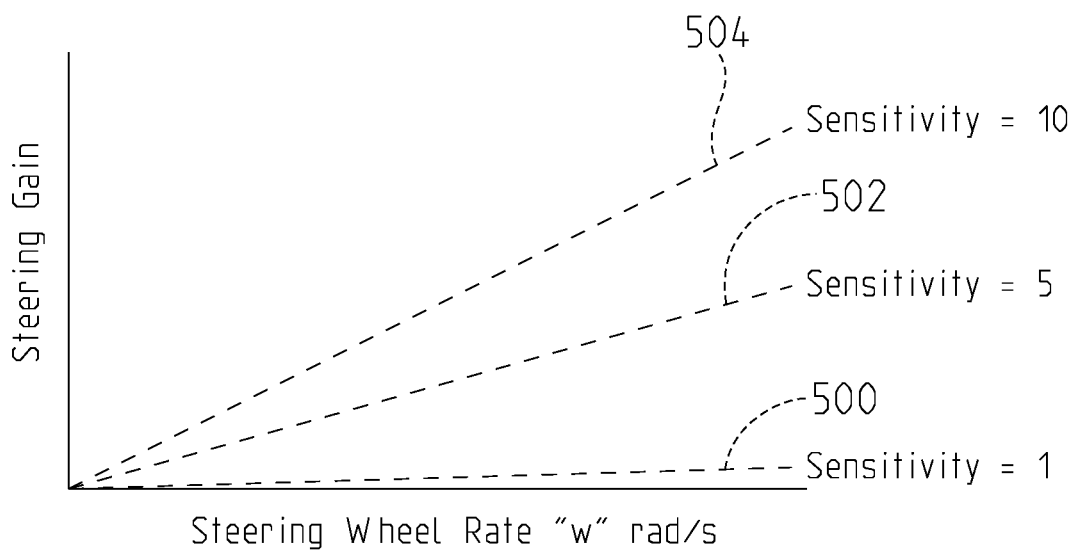
FIG. 5 is a graphical illustration of conventional rear steering variable gain curves.

As described above, an increase in steering gain provides a faster response at the rear of the machine which changes the trajectory of the vehicle more quickly. As shown in FIGS. 4 and 5, conventional implementations include a linear relationship or no relationship between the steering gain and the rate of the steering wheel. The conventional linear steering relationship may provide an adequate steering response for aggressive maneuvers such as avoiding an obstacle while transporting the machine on the highway, but it does not, however, provide smooth steering operation for mild maneuvers such as holding a straight line. Often times, the rear of the machine may kick out too quickly when making minor corrections causing the steering response to feel very jerky.

Figure 6:
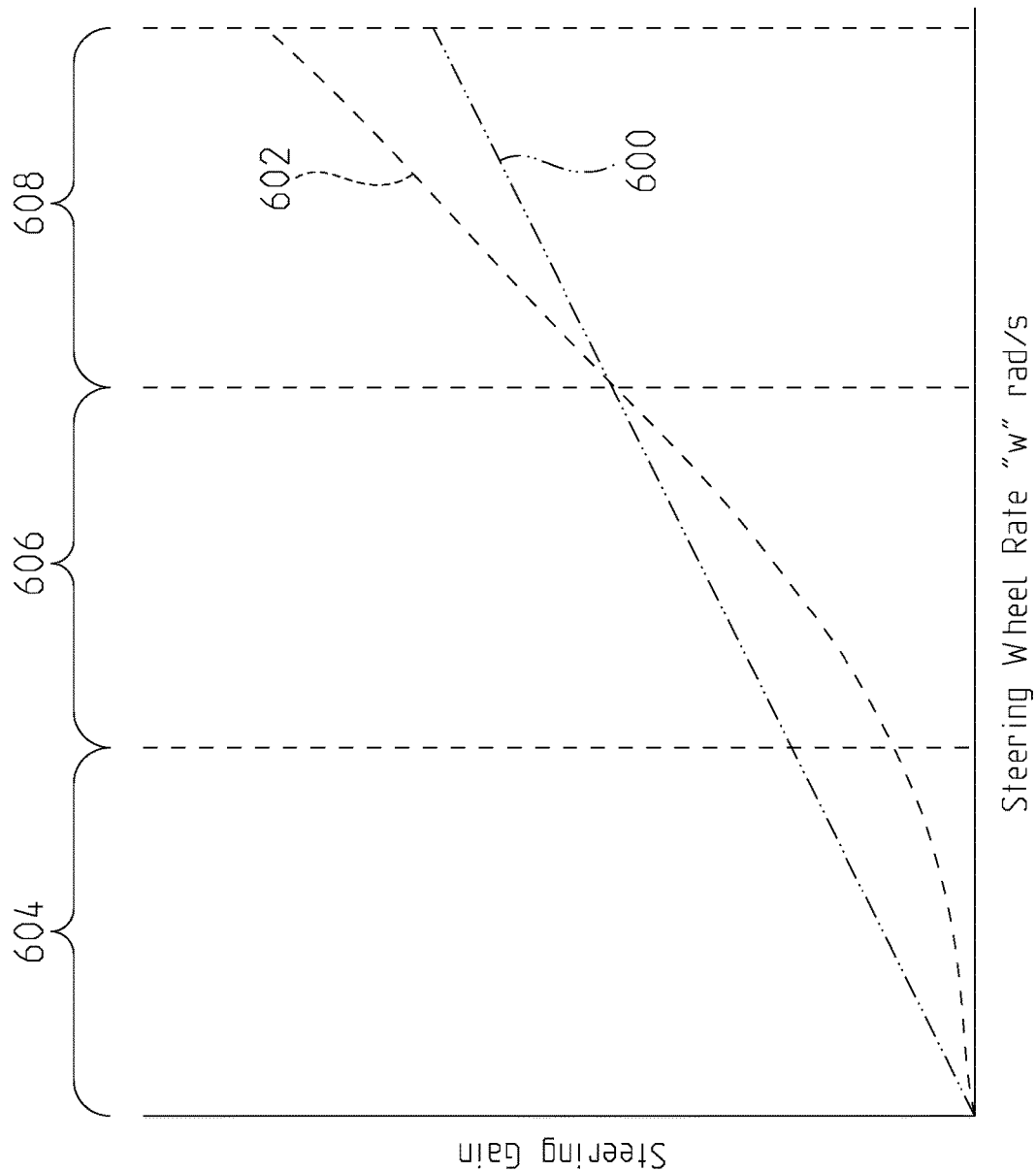
FIG. 6 is a graphical illustration of a conventional rear steering variable gain curve and a non-linear rear steering variable gain curve.

The proposed solution helps to smooth this response out by allowing for smooth minor corrections but quickly ramp up the steering response for more aggressive maneuvers which greatly improves the operator's perception on the controllability of the machine. An example of this is shown in FIG. 6. Here, a first curve 600 represents the conventional rear steering variable gear depicted as a constant linear slope. This corresponds with curves 402 and 404 of FIG. 4 and curves 500, 502, and 504 of FIG. 5. A second curve 602 is representative of the blended, non-liner rear steering variable gain. The advantages of the latter curve are best shown in FIG. 6 where the steering wheel rate is divided into three different areas. A first area 604 corresponds with a minimal rear steering influence. Here, for example, an operator may make a slight or small adjustment of the steering wheel to veer the machine back to a centerline. The conventional linear relationship shows that the gain is much greater than with the blended, non-linear relationship curve. The higher gain associated with the conventional linear relationship causes the aforementioned jerkiness when the operator seeks to make a small steering adjustment. With the blended, non-linear curve, the gain is much less and thus the comfort level is much greater for the operator.

The illustration in FIG. 6 also includes a second area 606 corresponding with a medium rear steering influence. Here, the blended, non-linear relationship provides a gain value less than the conventional linear relationship. Semi-aggressive maneuvers by the operator leads to improved lag time as the gain increases rapidly along the second curve 602 as the steering wheel rate increases. A third area 608 corresponds with aggressive maneuvers. Here, the blended, non-linear steering gain is greater than the conventional linear gain and thus provides a much quicker steering response as the steering wheel rate reaches a maximum rate. This effectively reduces the overall lag time and provides the operator with a more desirable steering response compared with the conventional system.

Figure 7:
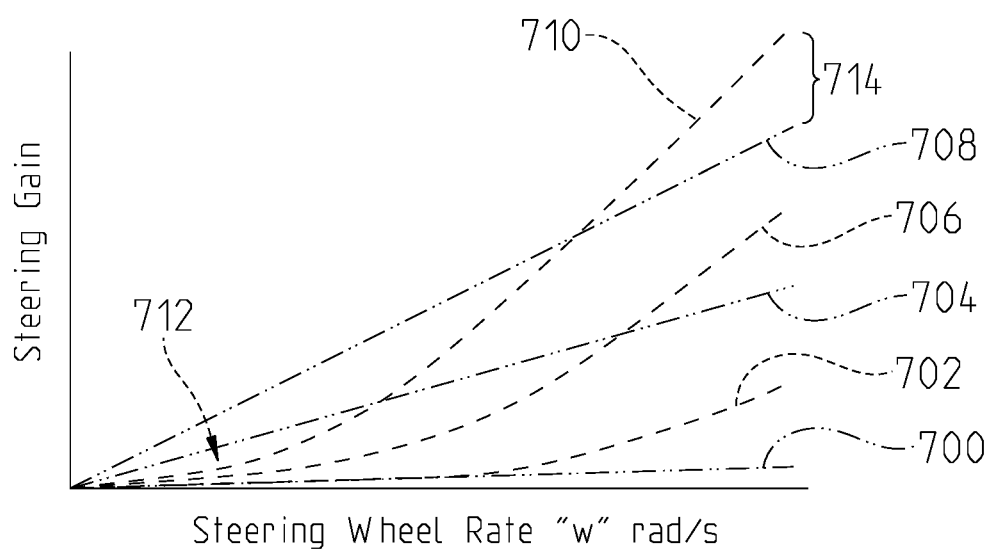
FIG. 7 is a graphical illustration of a plurality of conventional rear steering variable gain curves and a plurality of non-linear rear steering variable gain curves.

In FIG. 7, a plurality of the conventional linear rear steering variable gain curves and a plurality of the blended, non-linear rear steering variable gain curves are shown. In particular, the conventional, linear curves are overlaid with the blended, non-linear curves. In this illustration, for example, a first linear gain curve 700 for a minimal sensitivity level, a second linear gain curve 704 for a medium sensitivity level, and a third linear gain curve 708 for an aggressive or high sensitivity level are shown. Likewise, a first blended, non-linear curve 702 for a minimal sensitivity level, a second blended, non-linear curve 706 for a medium sensitivity level, and a third blended, non-linear curve 710 for an aggressive or high sensitivity level are shown. For slow steering responses (e.g., in an area designated 712), the slope of the gain relationship and gain value of the blended, non-linear curves are less than the conventional, linear curves. This provides an improvement wherein the machine's lateral response is less aggressive when compared to the conventional system while making slow steering wheel inputs during operations such as maintaining a straight vehicle trajectory or making minor adjustments to the vehicle trajectory.

To maintain expected steering performance, the slope of the blended, non-linear gain curves begins to rise to reduce lag time for normal to aggressive steering maneuvers (e.g., in an area designated 714). The performance may be quantified in terms of lag time between a steering wheel input and change in vehicle yaw rate. To further improve upon the change in the steering gain relationship, the non-linear gain profile is "blended" to prevent the system from behaving negatively when transitioning from one slope to the next.

Figure 8:
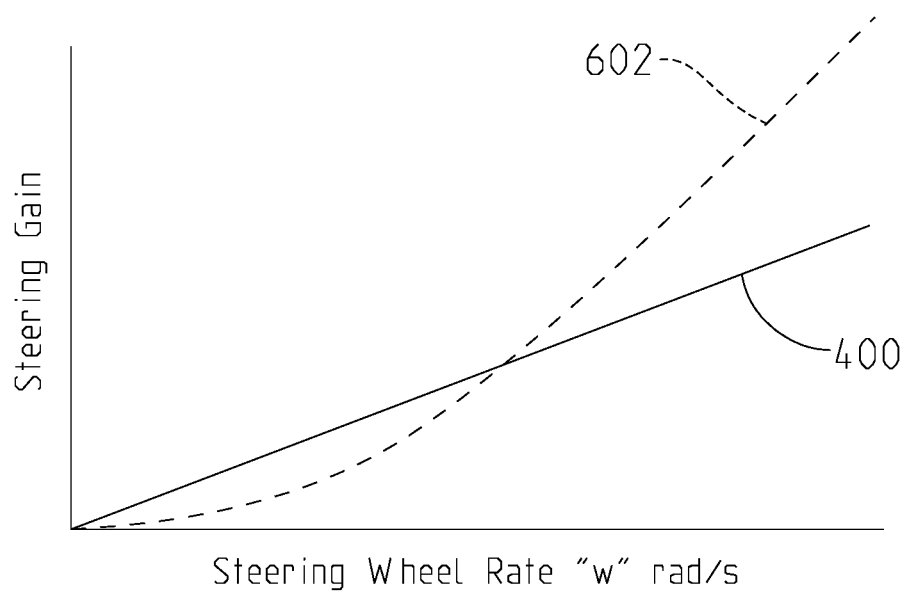
FIG. 8 is a graphical illustration of a non-linear rear steering variable gain curve and a conventional front hydro differential curve.
Figure 9:
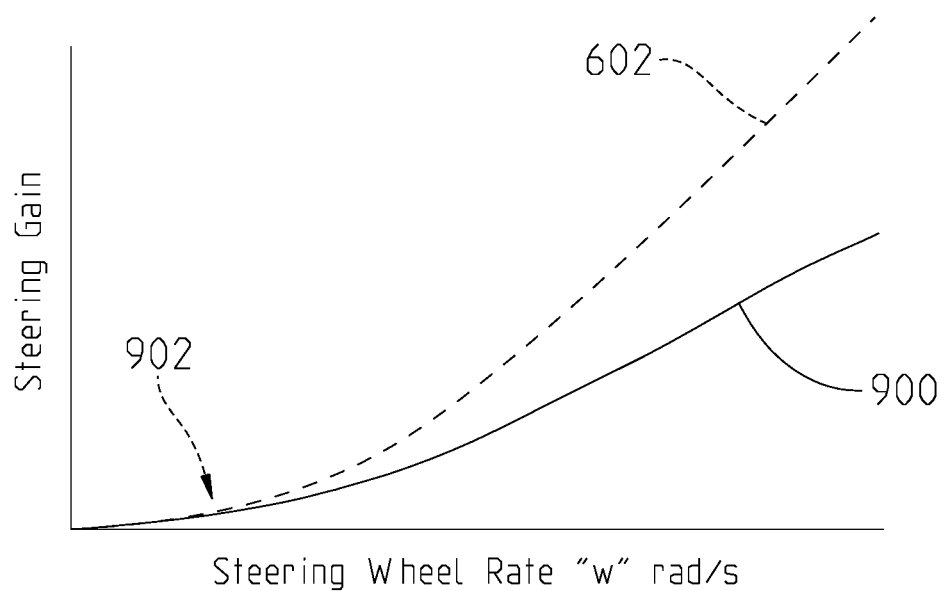
FIG. 9 is a graphical illustration of a non-linear rear steering variable gain curve and a non-linear front hydro differential curve.

Referring to FIG. 8, the conventional, linear relationship of the front hydro differential gains (e.g., curve 400) and the blended, non-linear relationship of the rear steering gains (e.g., curve 602) are shown. To further improve on the steering response of the overall system, the front hydro differential gain profile may be modified as shown as curve 900 in FIG. 9 such that the response is non-linear but better matches the curvature of the blended, non-linear rear steering variable gain curve 602. The modified front hydro differential gain curve 900 may be used with or without the assistance of the rear steering system. By modifying the front hydro differential gain curve from a linear slope to a blended, non-linear slope as shown in FIG. 9, the front and rear steering systems may be in-phase with one another. As the rear steering system is modified as described herein, the front steering system can often become out-of-phase with the rear steering system and induce an undesirable jerky motion. To overcome this, the blended, non-linear front hydro differential gain curve 900 better matches with the blended, non-linear rear steering variable gain curve 602 to provide a more smooth steering response, particularly in an area 902 at the lower steering wheel rates.

Figure 10:
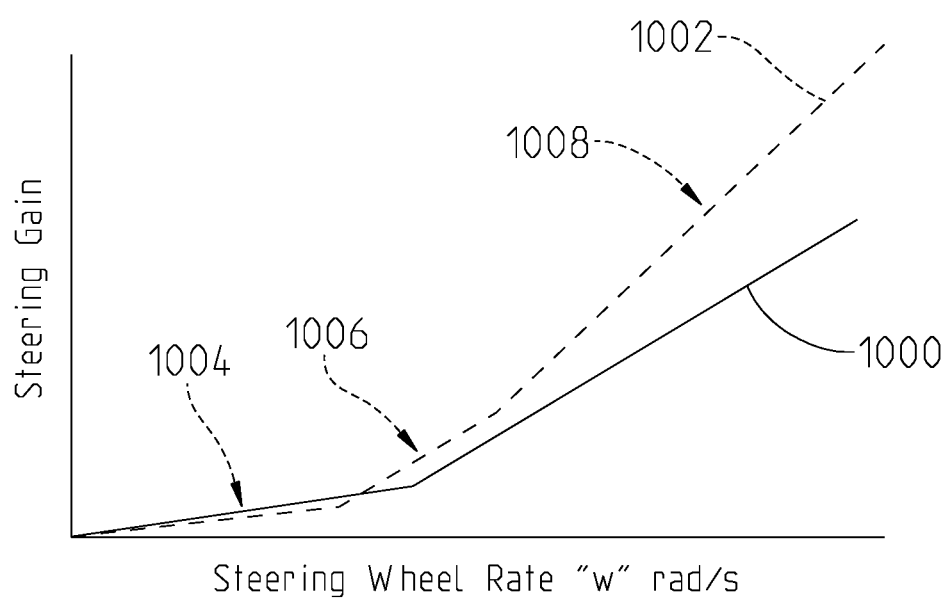
FIG. 10 is a graphical illustration of a varying slope rear steering variable gain curve and a varying slope front hydro differential curve.

Referring to FIG. 10, another embodiment of the present disclosure is provided. Here, blended multi-slope control may be achieved using several linear ramp segments in steering gain with respect to different ranges of steering wheel rates. In other words, the controller 300 may operably adjust steering gain of both the front and rear steering systems based on a pair of gain curves. A first curve 1000 may correspond with the front hydro differential gain that is controlled mechanically or via software. A second curve 1002 may correspond with the rear steering variable gain which is controlled via software by the controller 302. The first and second curves are neither linear with a constant slope nor curved as in FIGS. 6-9. Instead, the control signal from the controller 302 may consist of a plurality of ramps rather than a smooth curve relating steering gain to a given steering wheel input. Each individual ramp may be at least partially linear but with a different slope than the other ramps. In FIG. 10, for example, the second curve 1002 may include at least a first ramp or linear portion 1004 having a first slope, a second ramp or linear portion 1006 having a second slope, and a third ramp or linear portion 1008 having a third slope. The first ramp 1004 may be sloped less than the second ramp 1006, and the second ramp 1006 may be sloped less than the third ramp 1008.

Figure 11A:
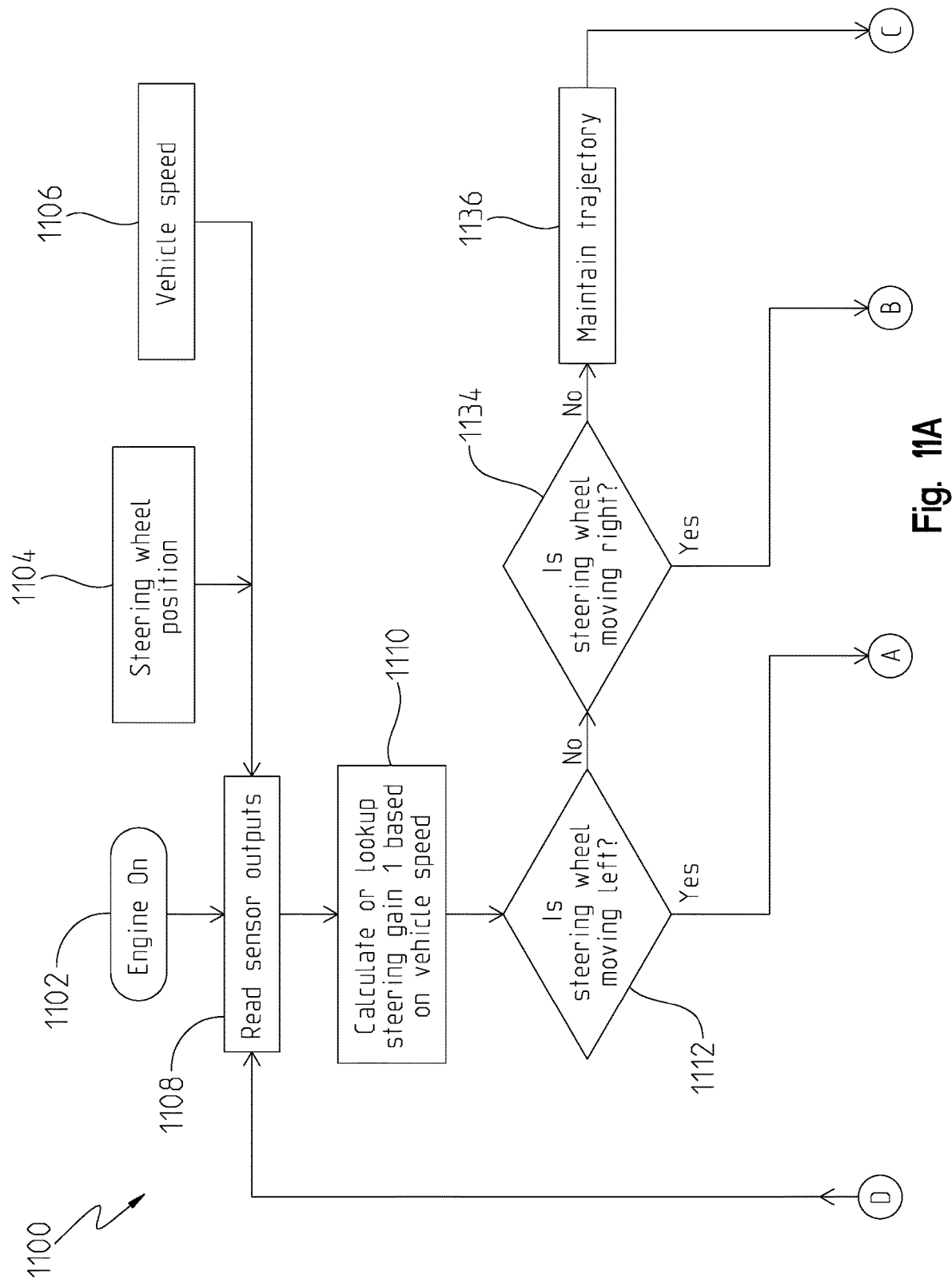
FIGS. 11A-C is a flow diagram of a method of controlling a front and rear steering system of the agricultural machine of FIG. 1.
Figure 11B:
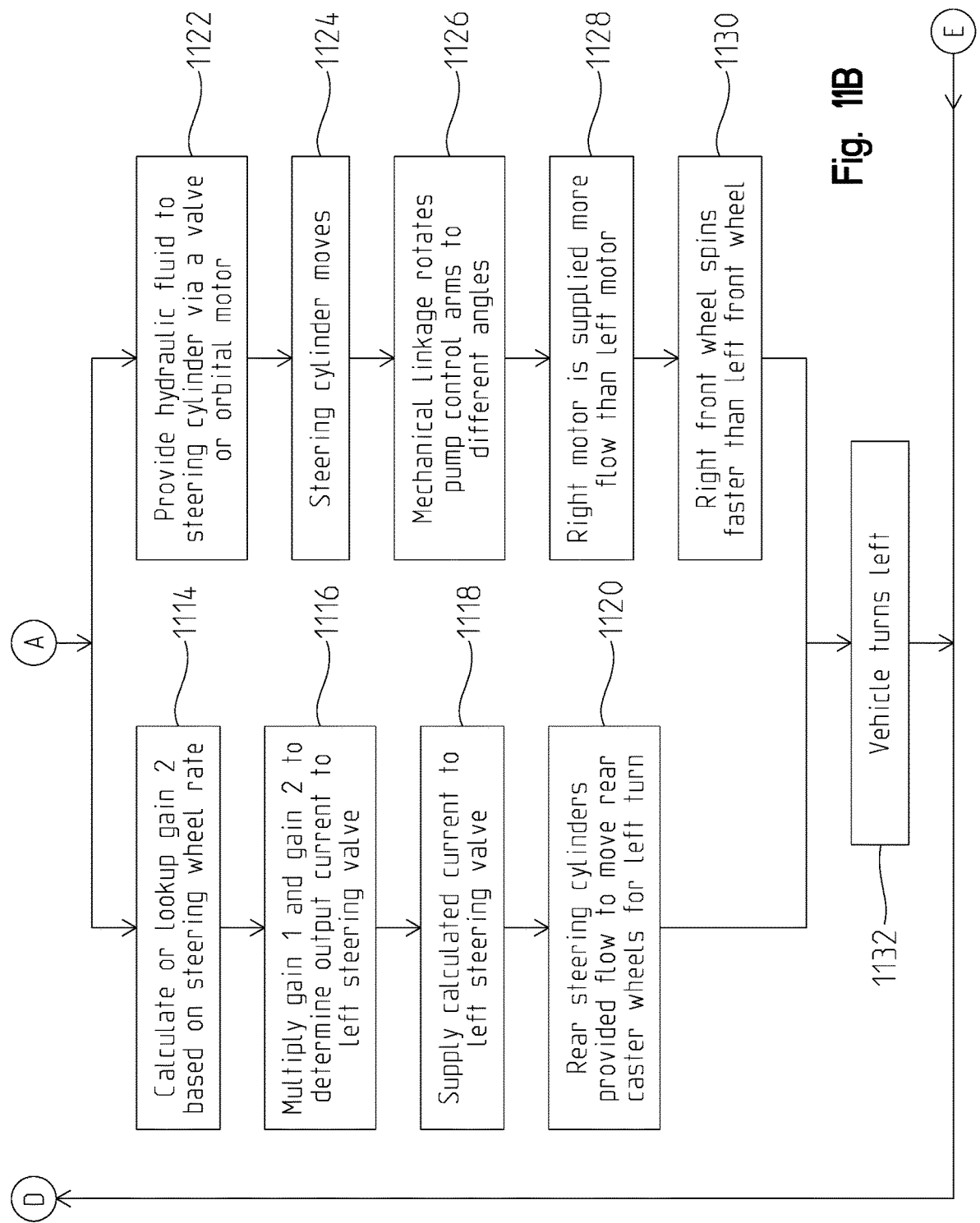
Figure 11C:
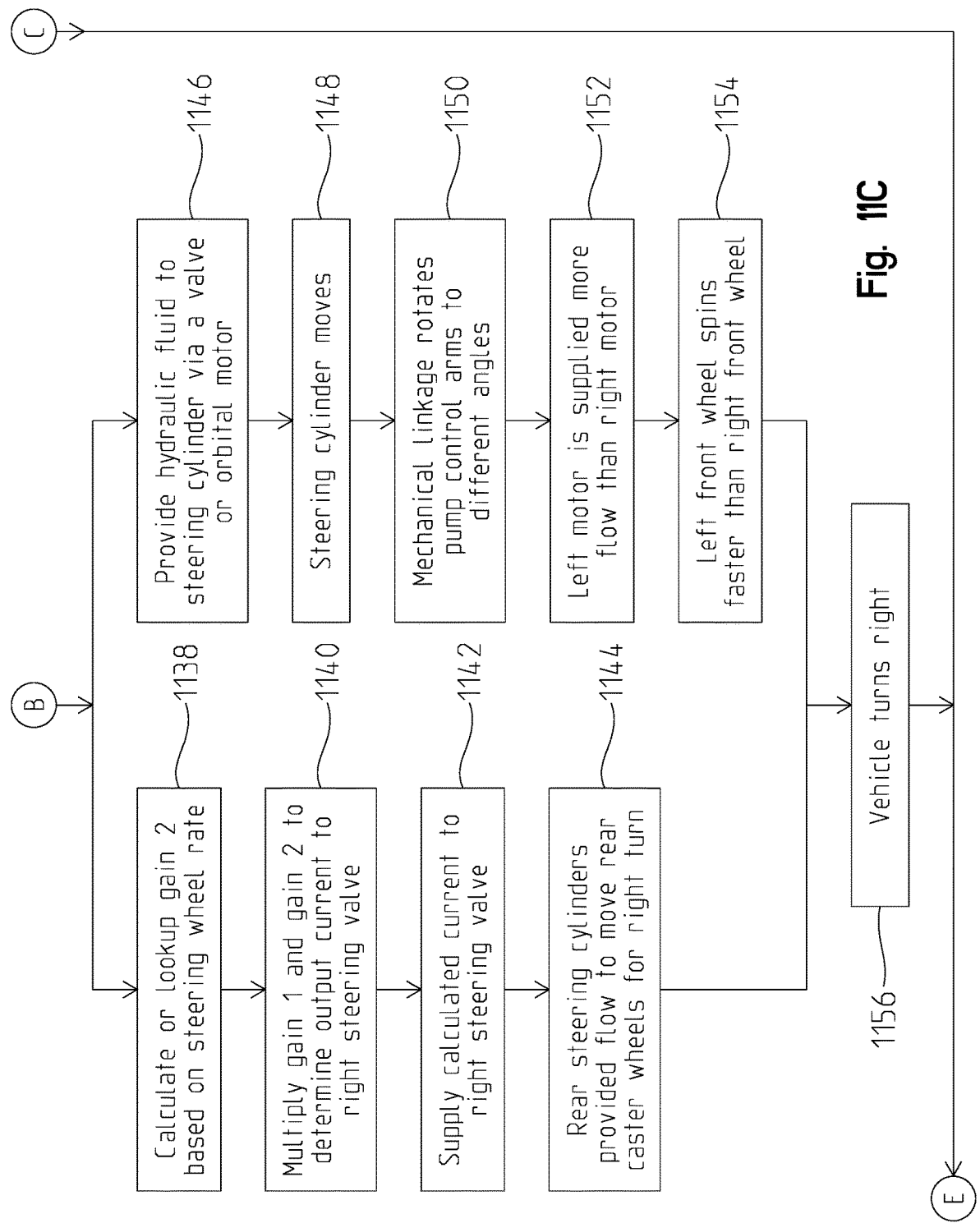

The present disclosure also discloses one or more embodiments of methods for controlling vehicle maneuverability via steering system control. In FIGS. 11A-C, for example, one embodiment of a control method 1100 for controlling the steering of an agricultural machine is shown. Here, the method 1100 may include a plurality of blocks or steps which are executed to cause the machine to travel in a desired travel direction. The illustrated blocks or steps are not intended to be limiting, nor are they intended to illustrate a specific order in which each must be executed relative to the other blocks or steps. Further, in other embodiments of the method 1100, other blocks or steps may be executed to achieve the desired control. Moreover, in other embodiments of the method 1100, one or more of the illustrated blocks or steps may not be executed to achieve desired control. Thus, the method 1100 of FIGS. 11A-C is not intended to be limiting but only illustrative of one example in which an agricultural machine may be controlled.

For sake of describing the control method 1100, the agricultural machine 20 of FIG. 1 includes the hydraulic system 68 of FIG. 2 and the control system 300 of FIG. 3. The controller 302 may include a memory unit (not shown) for storing software, algorithms, control logic, look-up tables, graphs, calculations, and the like in order to execute the control method 1100. All or only a portion of the control method 1100 may be stored in the memory unit as control logic which is executable by a processor (not shown) of the controller 302.

In a first block 1102 of the control method 1100, the controller 302 may determine if the engine or prime mover 24 is on. A steering wheel position may be detected by an operator steer input sensor 306 in block 1104 and a machine speed may be detected by a speed sensor 308 in block 1106. The controller 302 may read sensor outputs from the operator steer input sensor 306 and speed sensor 308 in block 1108 of the method 1100. From the outputs, the controller 302 may next calculate or lookup a first steering gain value in block 1110. The first steering gain value may be based solely off machine speed or a combination of machine speed and steering wheel position.

Once the first steering gain value is determined in block 1110, the method 1100 may advance to block 1112 where the controller 302 determines if the steering wheel (i.e., operator steer input) is moving. For example, the controller 302 may determine if the steering wheel is moving leftward or counterclockwise in block 1112. If not, the controller 302 may determine if the steering wheel is moving in a second direction, e.g., rightward or clockwise, in block 1134. If the controller 302 determines that the steering wheel is not moving in either the first or second direction in blocks 1112 and 1134, the method 1100 may advance to block 1136 and maintain the agricultural machine 20 in its current trajectory.

In the event the controller 302 determines the operator is turning the steering wheel in the first direction in block 1112, the method may advance to block 1114 where the controller 302 may calculate or lookup a second gain value based on steering wheel rate. Here, the controller 302 may include one or more blended, non-linear rear steering variable gain curves similar to those shown in FIGS. 6-9 where the controller 302 determines the gain therefrom. Once the second gain is determined in block 1114, the method 1100 may advance to block 1116 where the controller 302 multiplies the first gain value and the second gain value to determine an output current to the left steering command valve 76. Once the output current is determined, the controller 302 may send the calculated current to the valve 76 in block 1118 such that the left steering command valve 76 opens an amount corresponding to the output current to provide hydraulic fluid to actuate the left side actuator 56 and move the left rear caster wheel 44 in block 1120.

As the rear steering system is controlled according to blocks 1114 through 1120, the controller 302 is also able to control the front or primary steering system independently from the rear steering system. Moreover, the front or primary steering system may be controlled simultaneously or at a different time than the rear steering system. In FIGS. 11A-C, the front or primary steering system may include the mechanical mechanism as described above. As such, hydraulic fluid may be provided to the steering actuator via a valve or orbital motor in block 1122. As this happens, the steering actuator moves in block 1124 to induce rotational movement of the mechanical mechanism or linkage. This causes pump control arms to rotate to different angles to vary displacement in block 1126. To control the agricultural machine in the left or first direction, the right or second hydraulic motor 42 may receive more fluid flow than the left or first hydraulic motor 40 in block 1128. As this happens, the right front wheel 28 may spin or rotate faster than the left front wheel 26 in block 1130. Thus, the front or primary steering system may be controlled in blocks 1122-1130. In combination with the control of the front and rear steering systems, the agricultural machine 20 is able to turn in the left direction in block 1132.

In the event the controller 302 determines in block 1134 that the operator wants to turn the vehicle to the right, the method 1100 may advance to block 1138 where the controller 302 may calculate or lookup a second gain value based on steering wheel rate. Here, the controller 302 may include one or more blended, non-linear rear steering variable gain curves similar to those shown in FIGS. 6-9 where the controller 302 determines the gain therefrom. Once the second gain is determined in block 1138, the method 1100 may advance to block 1140 where the controller 302 multiplies the first gain value and the second gain value to determine an output current to the right steering command valve 78. Once the output current is determined, the controller 302 may send the calculated current to the valve 78 in block 1142 such that the right steering command valve 78 opens an amount corresponding to the output current to provide hydraulic fluid to actuate the right side actuator 58 and move the right rear caster wheel 46 in block 1144.

As the rear steering system is controlled according to blocks 1138 through 1144, the controller 302 is also able to control the front or primary steering system independently from the rear steering system. Here, hydraulic fluid may be provided to the steering actuator via a valve or orbital motor in block 1146. As this happens, the steering actuator moves in block 1148 to induce rotational movement of the mechanical mechanism or linkage. This causes pump control arms to rotate to different angles to vary displacement in block 1150. To control the agricultural machine in the right or second direction, the left or first hydraulic motor 40 may receive more fluid flow than the right or second hydraulic motor 42 in block 1152. As this happens, the left front wheel 26 may spin or rotate faster than the right front wheel 28 in block 1154. Thus, the front or primary steering system may be controlled in blocks 1146-1154. In combination with the control of the front and rear steering systems, the agricultural machine 20 is able to turn in the right direction in block 1156.

Figure 12A:
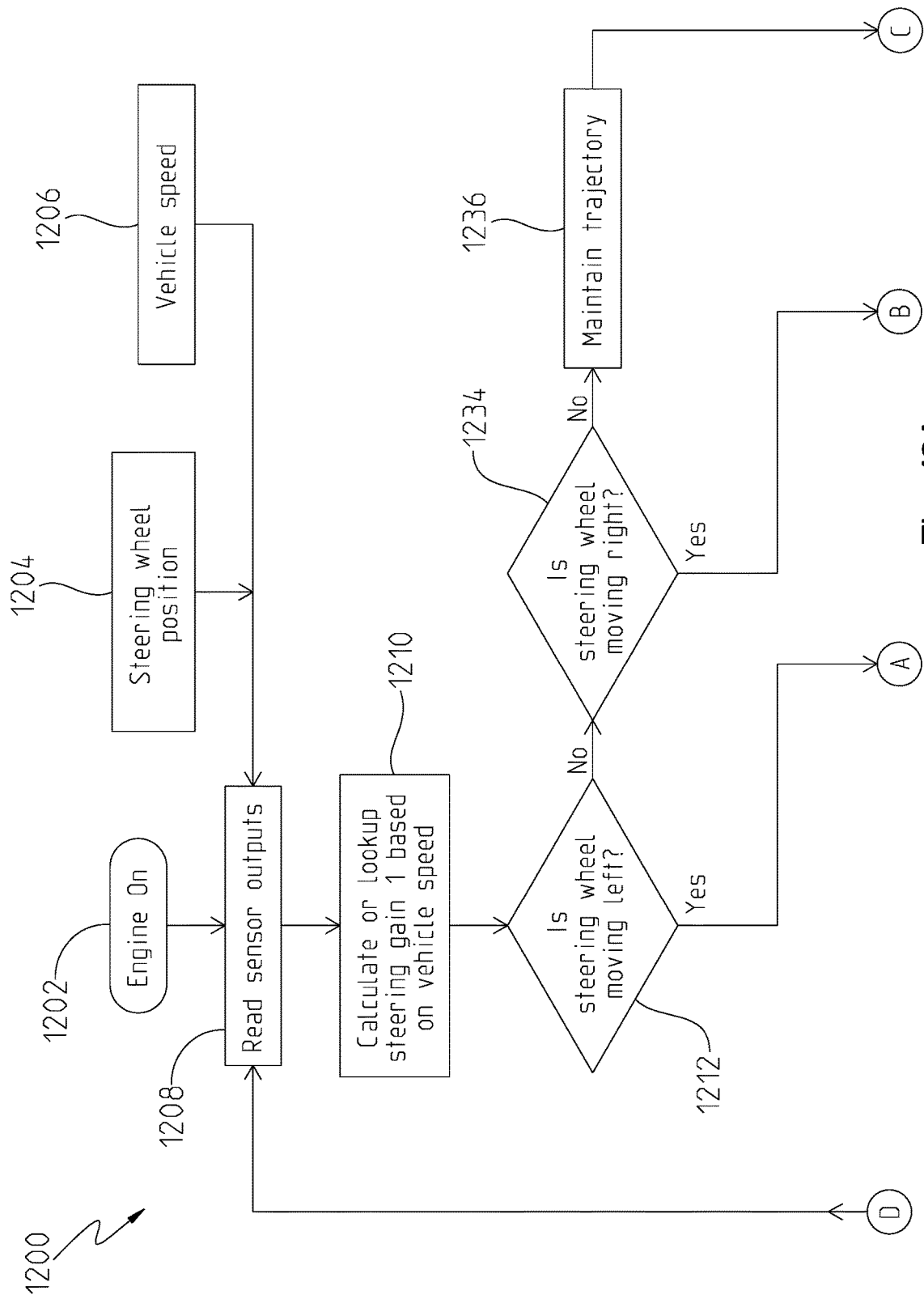
Figure 12C:
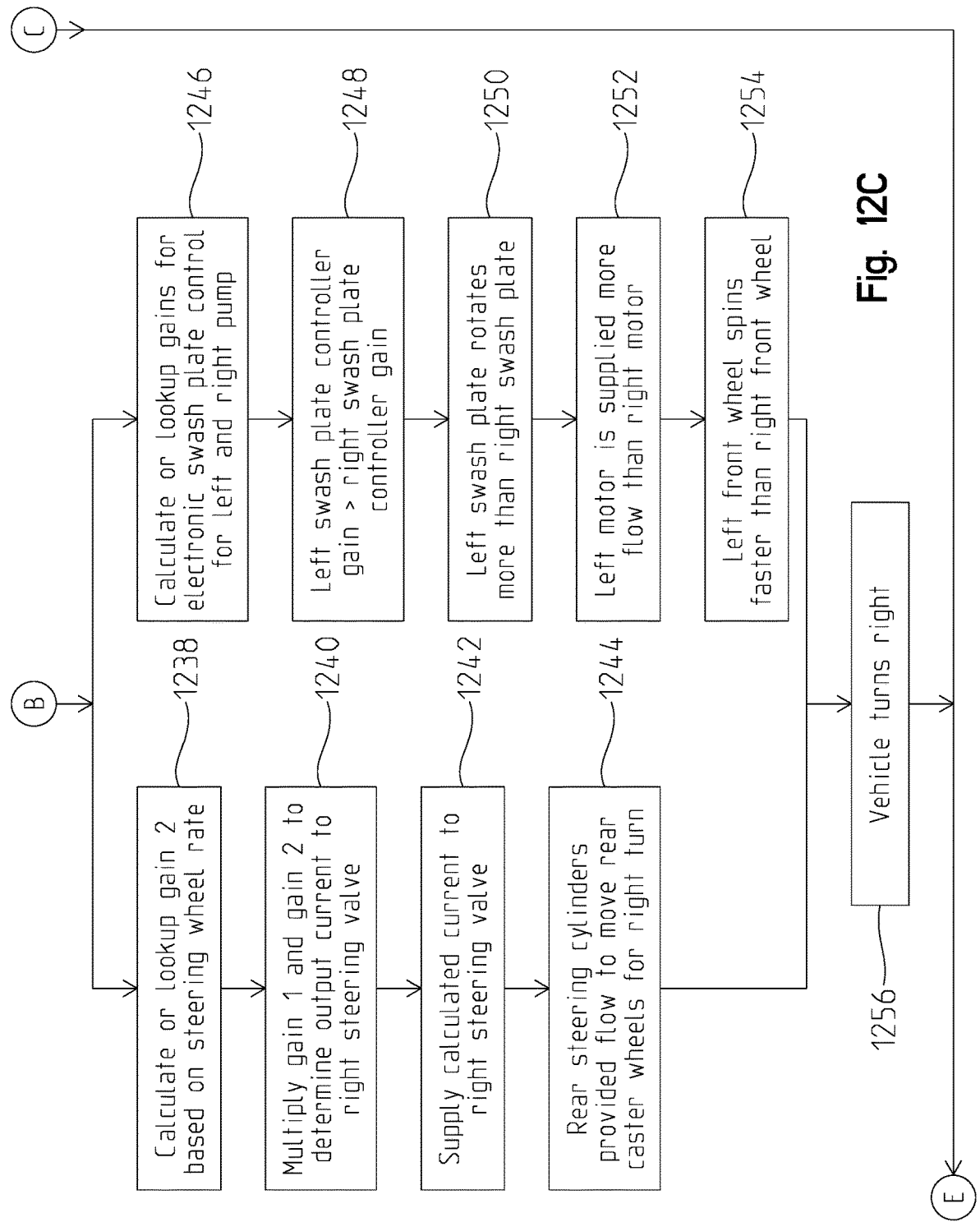

Referring to FIGS. 12A-C, another embodiment of a control method for controlling the steering of an agricultural machine is shown. Here, the method 1200 may include a plurality of blocks or steps which are executed to cause the machine to travel in a desired travel direction. The illustrated blocks or steps are not intended to be limiting, nor are they intended to illustrate a specific order in which each must be executed relative to the other blocks or steps. Further, in other embodiments of the method 1200, other blocks or steps may be executed to achieve the desired control. Moreover, in other embodiments of the method 1200, one or more of the illustrated blocks or steps may not be executed to achieve desired control. Thus, the method 1200 of FIGS. 12A-C is not intended to be limiting but only illustrative of one example in which an agricultural machine may be controlled.

For sake of describing the control method 1200, the agricultural machine 20 of FIG. 1 includes the hydraulic system 68 of FIG. 2 and the control system 300 of FIG. 3. However, unlike FIGS. 11A-C, the front steering system is described as being electrical rather than mechanical. The controller 302 may include a memory unit (not shown) for storing software, algorithms, control logic, look-up tables, graphs, calculations, and the like in order to execute the control method 1200. All or only a portion of the control method 1200 may be stored in the memory unit as control logic which is executable by a processor (not shown) of the controller 302.

In a first block 1202 of the control method 1200, the controller 302 may determine if the engine or prime mover 24 is on. A steering wheel position may be detected by an operator steer input sensor 306 in block 1204 and a machine speed may be detected by a speed sensor 308 in block 1206. The controller 302 may read sensor outputs from the operator steer input sensor 306 and speed sensor 308 in block 1208 of the method 1200. From the outputs, the controller 302 may next calculate or lookup a first steering gain value in block 1210. The first steering gain value may be based solely off machine speed or a combination of machine speed and steering wheel position.

Once the first steering gain value is determined in block 1210, the method 1200 may advance to block 1212 where the controller 302 determines if the steering wheel (i.e., operator steer input) is moving. For example, the controller 302 may determine if the steering wheel is moving leftward or counterclockwise in block 1212. If not, the controller 302 may determine if the steering wheel is moving in a second direction, e.g., rightward or clockwise, in block 1234. If the controller 302 determines that the steering wheel is not moving in either the first or second direction in blocks 1212 and 1234, the method 1200 may advance to block 1236 and maintain the agricultural machine 20 in its current trajectory.

In the event the controller 302 determines the operator is turning the steering wheel in the first direction in block 1212, the method may advance to block 1214 where the controller 302 may calculate or lookup a second gain value based on steering wheel rate. Here, the controller 302 may include one or more blended, non-linear rear steering variable gain curves similar to those shown in FIGS. 6-9 where the controller 302 determines the gain therefrom. Once the second gain is determined in block 1214, the method 1200 may advance to block 1216 where the controller 302 multiplies the first gain value and the second gain value to determine an output current to the left steering command valve 76. Once the output current is determined, the controller 302 may send the calculated current to the valve 76 in block 1218 such that the left steering command valve 76 opens an amount corresponding to the output current to provide hydraulic fluid to actuate the left side actuator 56 and move the left rear caster wheel 44 in block 1220.

As the rear steering system is controlled according to blocks 1214 through 1220, the controller 302 is also able to control the front or primary steering system independently from the rear steering system. Moreover, the front or primary steering system may be controlled simultaneously or at a different time than the rear steering system. In FIGS. 12A-C, the front or primary steering system may include electric motors for rotatably driving the front wheels. Front steering gains may or may not be dependent on motor displacement. In any event, the controller 302 may calculate or lookup gains for electronic swash plate control for left and right pumps in block 1222. As it does, the right swash plate controller gain is greater than the left swash plate controller gain in block 1224. In block 1226, the right swash plate rotates more than the left swash plate such that the right motor is suppled more flow than the left motor in block 1228. Thus, the right front wheel spins or rotates faster than the left front wheel in block 1230. In combination with the control of the front and rear steering systems, the agricultural machine 20 is able to turn in the left direction in block 1232.

In the event the controller 302 determines in block 1234 that the operator wants to turn the vehicle to the right, the method 1200 may advance to block 1238 where the controller 302 may calculate or lookup a second gain value based on steering wheel rate. Here, the controller 302 may include one or more blended, non-linear rear steering variable gain curves similar to those shown in FIGS. 6-9 where the controller 302 determines the gain therefrom. Once the second gain is determined in block 1238, the method 1200 may advance to block 1240 where the controller 302 multiplies the first gain value and the second gain value to determine an output current to the right steering command valve 78. Once the output current is determined, the controller 302 may send the calculated current to the valve 78 in block 1242 such that the right steering command valve 78 opens an amount corresponding to the output current to provide hydraulic fluid to actuate the right side actuator 58 and move the right rear caster wheel 46 in block 1244.

As the rear steering system is controlled according to blocks 1238 through 1244, the controller 302 is also able to control the front or primary steering system independently from the rear steering system. Here, the controller 302 may calculate or lookup gains for electronic swash plate control for left and right pumps in block 1246. As it does, the left swash plate controller gain is greater than the right swash plate controller gain in block 1248. In block 1250, the left swash plate rotates more than the right swash plate such that the left motor is suppled more flow than the right motor in block 1252. Thus, the left front wheel spins or rotates faster than the right front wheel in block 1254. In combination with the control of the front and rear steering systems, the agricultural machine 20 is able to turn in the left direction in block 1256.

Figure 13:
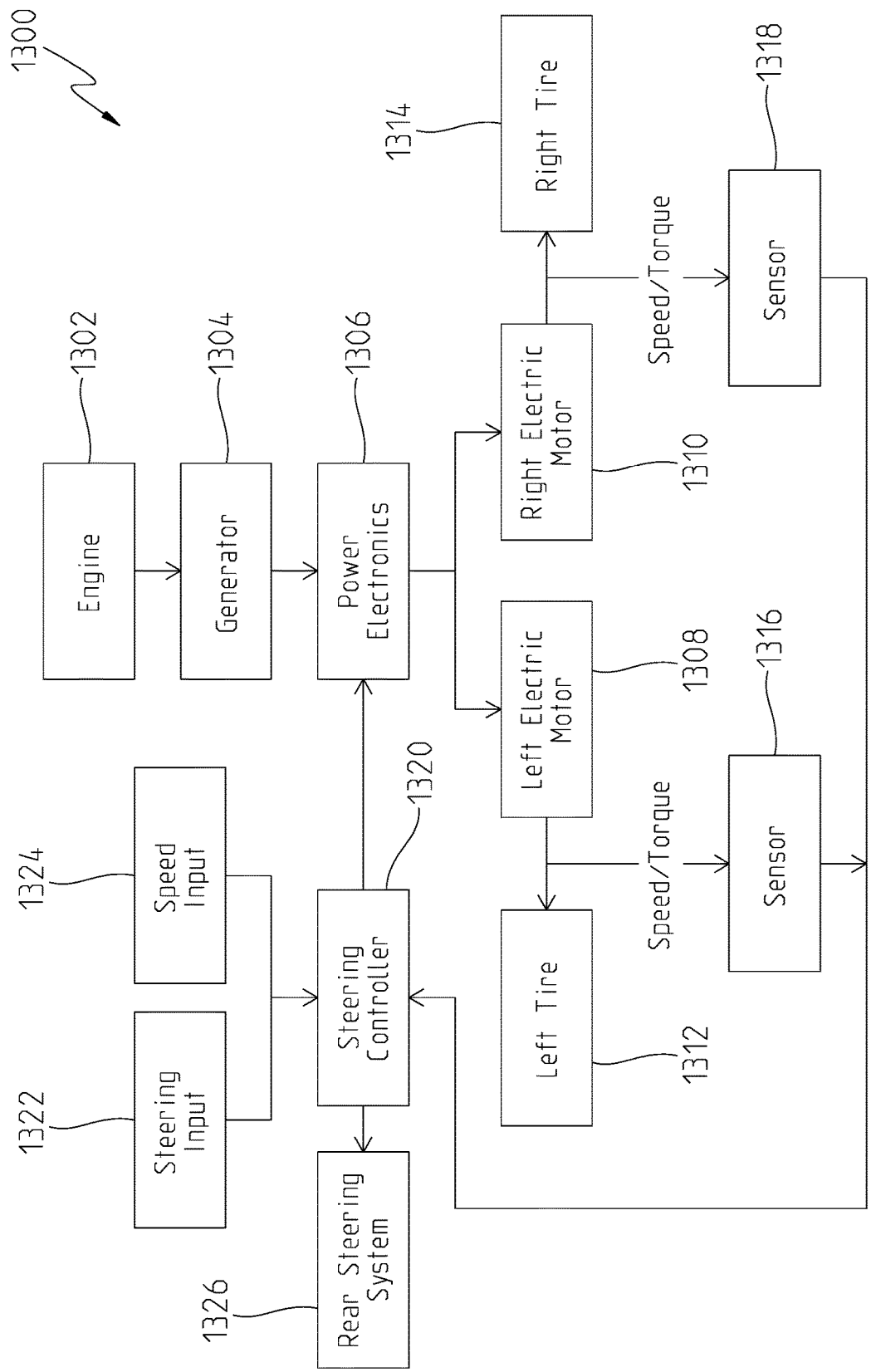
FIG. 13 is a schematic of a front steering system including an electrical control system.

Referring to FIG. 13, a further embodiment of the present disclosure is shown. Here, the first or primary steering system 1300 is shown as an electric control system. Here, for example, the engine or prime mover 1302 is able to produce and transfer power to an electric generator 1304. In turn, the generator feeds electric power to power electronics 1306. The power electronics 1306 may include speed and torque controllers for a first or left electric motor 1308 and a second or right electric motor 1310.

The first and second electric motors 1308, 1310 may be able to operably drive a first or left tire 1312 and a second or right tire 1314 of the vehicle. The first and second tires may correspond to the left front drive wheel 26 and the right front drive wheel 28 as shown in FIG. 1. In FIG. 1, the pair of front drive wheels are powered by hydraulic motors, whereas in FIG. 13 the pair of front wheels are powered by electric motors.

A first sensor 1316 may be in communication with the first electric motor 1308 for detecting a speed and torque value being output to the left tire 1312. Similarly, a second sensor 1318 may be in communication with the second electric motor 1310 for detecting a speed and torque value being output to the right tire 1314. The first and second sensors 1316, 1318 may be in electrical communication with a steering controller 1320 for outputting these values to the controller.

The steering controller 1320 may correspond to the controller 302 of FIG. 3. Alternatively, it may be a different controller. In any event, the steering controller 1320 may receive additional inputs from a steering input 1322 and a speed input 1324. The steering input 1322 may come from a steering wheel, joystick or other operator control for commanding a steer request. The speed input 1324 may come from a speed request from the operator. Here, the operator may command a vehicle speed request to achieve a desired vehicle speed, and the steering controller 1320 may receive this request.

Likewise, the steering controller 1320 may communicate with the second or rear steering system 1326 as shown in FIG. 13. In at least one embodiment, the steering controller 1320 may operably control the response of both the front and rear steering systems. In another embodiment, the steering controller 1320 may only control the front steering system and a second controller may control the rear steering system. As shown, the steering controller 1320 is in communication with the power electronics 1306 for controlling the output of the first and second electric motors 1308, 1310.

Figure 14A:
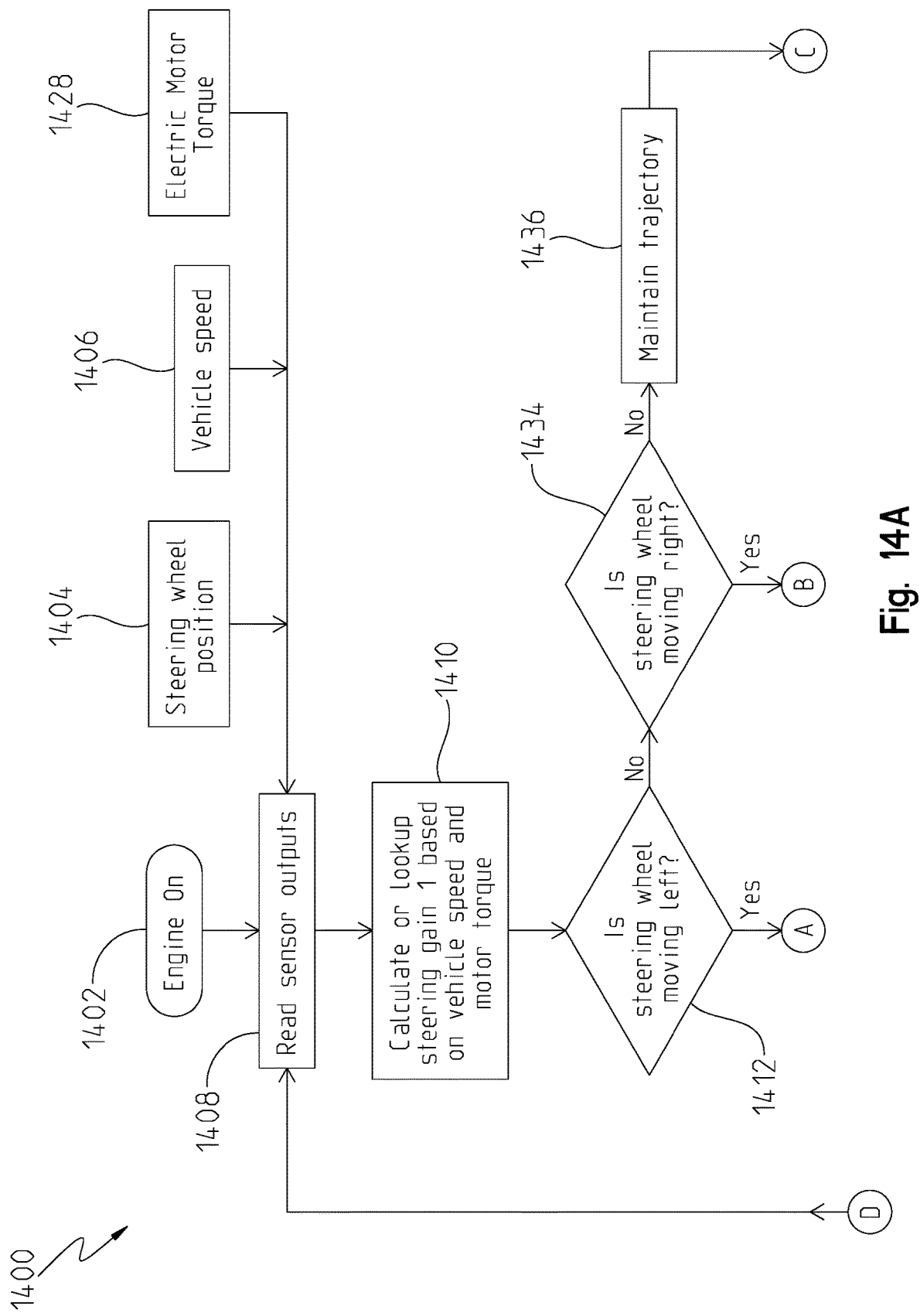
FIGS. 14A-C is a flow diagram of a method of controlling the front steering system of FIG. 13 and a rear steering system of the agricultural machine of FIG. 1.
Figure 14B:
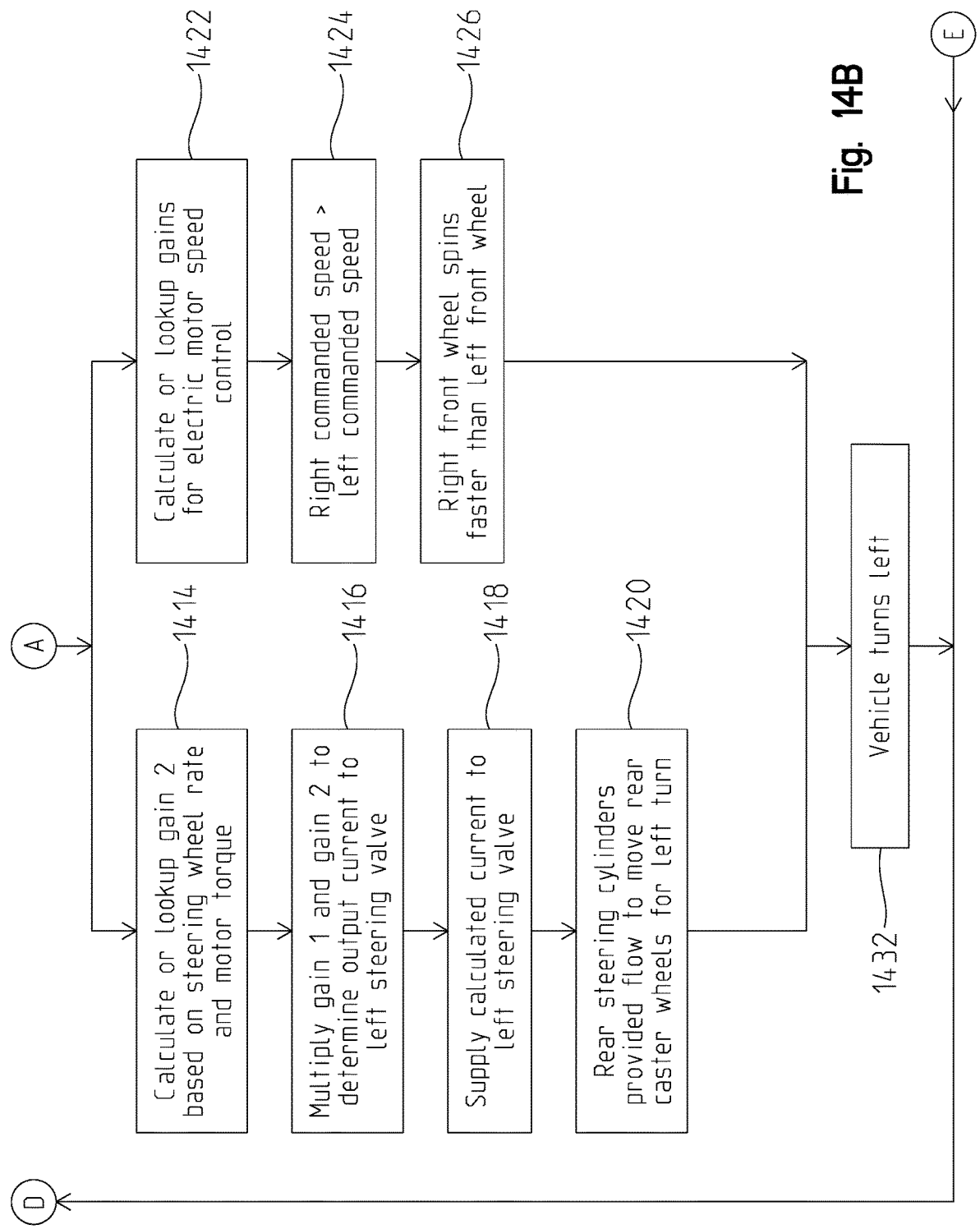
Figure 14C:
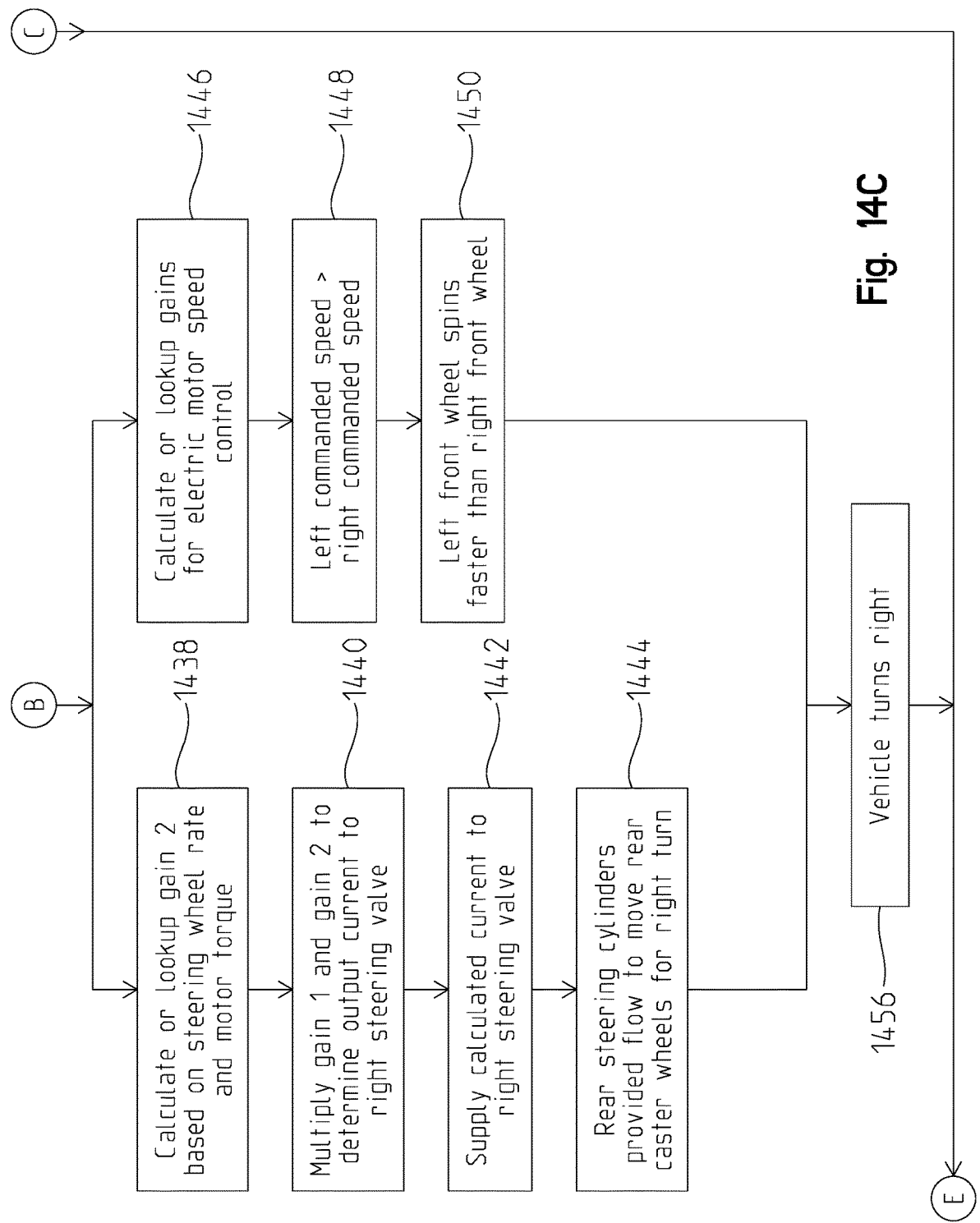

Turning to FIGS. 14A-C, another embodiment of a control method for controlling the steering of an agricultural machine is shown. Here, the method 1400 may include a plurality of blocks or steps which are executed to cause the machine to travel in a desired travel direction. The illustrated blocks or steps are not intended to be limiting, nor are they intended to illustrate a specific order in which each must be executed relative to the other blocks or steps. Further, in other embodiments of the method 1400, other blocks or steps may be executed to achieve the desired control. Moreover, in other embodiments of the method 1400, one or more of the illustrated blocks or steps may not be executed to achieve desired control. Thus, the method 1400 of FIGS. 14A-C is not intended to be limiting but only illustrative of one example in which an agricultural machine may be controlled.

For sake of describing the control method 1400, the agricultural machine 20 of FIG. 1 includes the electric control system 1300 of FIG. 13. The controller 1320 may include a memory unit (not shown) for storing software, algorithms, control logic, look-up tables, graphs, calculations, and the like in order to execute the control method 1400. All or only a portion of the control method 1400 may be stored in the memory unit as control logic which is executable by a processor (not shown) of the controller 1320.

In a first block 1402 of the control method 1400, the controller 1320 may determine if the engine or prime mover 1302 is on. A steering wheel position may be detected by an operator steer input sensor 306 in block 1404 and a machine speed may be detected by a speed sensor 308 in block 1406. Further, in block 1428, electric motor torque detected by the first and second sensors 1316, 1318 may be communicated to the controller 1320. The controller 1320 may read sensor outputs from the operator steer input sensor 306, speed sensor 308, and first and second sensors 1316, 1318 in block 1408 of the method 1400. From the outputs, the controller 1320 may next calculate or lookup a first steering gain value in block 1410. The first steering gain value may be based solely off machine speed or a combination of machine speed and steering wheel position.

Once the first steering gain value is determined in block 1410, the method 1400 may advance to block 1412 where the controller 1320 determines if the steering wheel (i.e., operator steer input) is moving. For example, the controller 1320 may determine if the steering wheel is moving leftward or counterclockwise in block 1412. If not, the controller 1320 may determine if the steering wheel is moving in a second direction, e.g., rightward or clockwise, in block 1434. If the controller 1320 determines that the steering wheel is not moving in either the first or second direction in blocks 1412 and 1434, the method 1400 may advance to block 1436 and maintain the agricultural machine 20 in its current trajectory.

In the event the controller 1320 determines the operator is turning the steering wheel in the first direction in block 1412, the method may advance to block 1414 where the controller 1302 may calculate or lookup a second gain value based on steering wheel rate and motor torque. Here, the controller 1302 may include one or more blended, non-linear rear steering variable gain curves similar to those shown in FIGS. 6-9 where the controller 1302 determines the gain therefrom. Once the second gain is determined in block 1414, the method 1400 may advance to block 1416 where the controller 1302 multiplies the first gain value and the second gain value to determine an output current to the left steering command valve 76. Once the output current is determined, the controller 1302 may send the calculated current to the valve 76 in block 1418 such that the left steering command valve 76 opens an amount corresponding to the output current to provide hydraulic fluid to actuate the left side actuator 56 and move the left rear caster wheel 44 in block 1420.

As the rear steering system is controlled according to blocks 1414 through 1420, the controller 1302 is also able to control the front or primary steering system 1300 independently from the rear steering system. Moreover, the front or primary steering system 1300 may be controlled simultaneously or at a different time than the rear steering system. In FIGS. 14A-C, the front or primary steering system 1300 may include electric motors 1308, 1310 for rotatably driving the front wheels or tires 1312, 1314. Front steering gains may or may not be dependent on motor torque. In any event, the controller 1302 may calculate or lookup gains for electric motor speed control in block 1422. As it does, the right commanded speed is greater than the left commanded speed in block 1424. In block 1426, the right front wheel spins or rotates faster than the left front wheel. In combination with the control of the front and rear steering systems, the agricultural machine 20 is able to turn in the left direction in block 1432.

In the event the controller 1302 determines in block 1434 that the operator wants to turn the vehicle to the right, the method 1400 may advance to block 1438 where the controller 1302 may calculate or lookup a second gain value based on steering wheel rate and motor torque. Here, the controller 1302 may include one or more blended, non-linear rear steering variable gain curves similar to those shown in FIGS. 6-9 where the controller 1302 determines the gain therefrom. Once the second gain is determined in block 1438, the method 1400 may advance to block 1440 where the controller 1302 multiplies the first gain value and the second gain value to determine an output current to the right steering command valve 78. Once the output current is determined, the controller 1302 may send the calculated current to the valve 78 in block 1442 such that the right steering command valve 78 opens an amount corresponding to the output current to provide hydraulic fluid to actuate the right side actuator 58 and move the right rear caster wheel 46 in block 1444.

As the rear steering system is controlled according to blocks 1438 through 1444, the controller 1302 is also able to control the front or primary steering system 1300 independently from the rear steering system. Here, the controller 1302 may calculate or lookup gains for electric motor speed control in block 1446. As it does, the left commanded speed is determined to be greater than the right commanded speed in block 1448. In block 1450, the left front wheel spins or rotates faster than the right front wheel. In combination with the control of the front and rear steering systems, the agricultural machine 20 is able to turn in the right direction in block 1456.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A steering system for controlling an agricultural machine having a front traction mechanism and a pair of rear wheels, comprising:
   a controller;
   an operator steer input configured to be operably controlled by an operator to communicate a steer command of the operator;
   a steer input sensor in communication with the operator steer input and the controller, the steer input sensor configured to detect and output the steer command to the controller;
   a primary differential steering system for operably controlling the front traction mechanism; and
   a secondary steering system for operably controlling the pair of rear wheels, the secondary steering system comprising a first actuator for controlling a steer position of a first rear wheel of the pair of rear wheels and a second actuator for controlling a steer position of a second rear wheel of the pair of rear wheels;
   wherein, the primary differential steering system is controlled based on the steer command;
   wherein, the controller outputs a control signal to operably actuate the first and second actuators at a non-linear steering gain rate as a function of the steer command.

2. The steering system of claim 1, wherein the first and second actuators are operably controlled independently from one another.

3. The steering system of claim 1, wherein the first and second actuators comprise electric actuators.

4. The steering system of claim 1, wherein the primary differential steering system comprises:
   a first pump and a first motor for operably controlling a first traction mechanism of the front traction mechanism;
   a second pump and a second motor for operably controlling a second traction mechanism of the front traction mechanism;
   a steering actuator operably controlled based on the steer command; and
   a mechanical mechanism for varying a displacement of the first and second pumps based on a first control signal.

5. The steering system of claim 1, wherein the primary differential steering system comprises:
   a first pump and a first motor for operably controlling a first traction mechanism of the front traction mechanism; and
   a second pump and a second motor for operably controlling a second traction mechanism of the front traction mechanism;
   wherein, the controller determines a gain for an electronic swash plate control for each of the first and second pumps;
   further wherein, a first control signal comprises a first portion of flow to the first motor and a second portion of flow to the second motor as a function of the gain.

6. The steering system of claim 5, wherein the first control signal comprises a linear steering gain rate as a function of the steer command.

7. The steering system of claim 5, wherein the first control signal comprises a non-linear steering gain rate as a function of the steer command.

8. The steering system of claim 1, wherein the non-linear steering gain rate comprises a plurality of ramps of varying slope.

9. The steering system of claim 1, further comprising an operator gain input disposed in communication with the controller, the operator gain input configured to be operably controlled by an operator to select one of a plurality of non-linear steering gain rates for controlling the secondary steering system, wherein each of the plurality of non-linear steering gain rates outputs a different gain value as a function of the steering command.

10. The steering system of claim 1, wherein the rear steering system comprises a hydraulic system comprising:
   a pressure source configured to supply a flow of pressurized fluid;
   a tank configured to receive the fluid and supply the fluid to the pressure source;
   a first steering command valve and a second steering command valve;
   a first steering fluid circuit interconnecting the first actuator and the first steering command valve in fluid communication; and
   a second steering fluid circuit interconnecting the second actuator and the second steering command valve in fluid communication;
   wherein, the steer command comprises a steer direction and a steer rate;
   wherein, the control signal is supplied to the first or second steering command valve based on the steer rate to induce a steering motion of the first or second rear wheel.

11. A method of controlling a steering motion of an agricultural machine, comprising:
   providing the agricultural machine with a controller, a steering wheel, a steer input sensor, a machine speed sensor, a prime mover for propelling the machine in a travel direction, a primary differential steering system for operably controlling a front traction mechanism, and a secondary steering system comprising a first actuator for controlling a steer position of a first rear wheel and a second actuator for controlling a steer position of a second rear wheel;
   detecting a machine speed with the machine speed sensor and a position of the steering wheel with the steer input sensor;
   determining a first gain value as a function of the machine speed;
   determining a steer command of the operator from the position of the steering wheel, the steer command comprising a first steer direction and a first steer rate;
   determining a second gain value based on the steer command;

calculating a control signal based on the first gain value and the second gain value;

outputting the control signal to a steering valve of the secondary steering system, wherein the control signal comprises a non-linear steering gain as a function of the steer command;

actuating the first and second actuators based on the control signal; and operably controlling the first and second rear wheels to cause the steering motion of the agricultural machine.

12. The method of claim 11, further comprising:

providing hydraulic fluid to a steering cylinder of the primary differential steering system;

rotating a mechanical mechanism of the primary differential steering system based on the amount of hydraulic fluid provided to the steering cylinder;

directing a first amount of fluid flow to a first motor of the primary differential steering system and a second amount of fluid flow to a second motor of the primary steering system; and rotating a first traction mechanism of the front traction mechanism by the first motor and a second traction mechanism of the front traction mechanism by the second motor;

wherein, the first traction mechanism rotates faster than the second traction mechanism.

13. The method of claim 12, further comprising:

providing the primary differential steering system with a first pump and a second pump;

changing a displacement of the first pump or second pump based on the steer command;

supplying the first amount of fluid flow from the first pump to the first motor; and supplying the second amount of fluid flow from the second pump to the second motor.

14. The method of claim 12, further comprising varying a displacement of the first motor or second motor based on the steer command.

15. The method of claim of claim 11, further comprising:

providing the differential steering system with a power source, a power electronics, a first electric motor, and a second electric motor;

supplying a speed command to the power electronics to vary an output speed of the first electric motor and the second electric motor; and rotating a first traction mechanism of the front traction mechanism by the first electric motor and a second traction mechanism of the front traction mechanism by the second electric motor, where the first traction mechanism rotates faster than the second traction mechanism.

16. The method of claim 11, further comprising outputting a second control signal to the primary differential steering system, wherein the second control signal comprises a linear steering gain rate as a function of the steer command.

17. The method of claim 11, further comprising outputting a second control signal to the primary differential steering system, wherein the second control signal comprises a non-linear steering gain rate as a function of the steer command.

18. The method of claim 11, wherein the non-linear steering gain rate comprises a plurality of ramps of varying slope as a function of the steer command.

19. The method of claim 11, further comprising:

providing a plurality of non-linear steering gain rates as a function of a steering wheel rate, where each of the plurality of non-linear steering gain rates outputs a different gain value at a discrete steering wheel rate;

receiving a command by the controller from an operator gain input corresponding to a selection of a first non-linear steering gain rate of the plurality of non-linear steering gain rates;

and outputting the control signal to the secondary steering system based on the first non- linear steering gain rate.

20. A steering system for controlling an agricultural machine, comprising:

a control system, comprising:

a controller, an operator steer input configured to be operably controlled by an operator to communicate a steer command of the operator;

a steer input sensor in communication with the operator steer input and the controller, the steer input sensor configured to detect and output the steer command to the controller; and an operator gain input configured to be operably controlled by the operator to select from a plurality of non-linear steering gain curves as a function of steer command;

a primary differential steering system for operably controlling a front traction mechanism, the primary differential steering system comprising a first pump and a first motor for operably controlling a first traction mechanism of the front traction mechanism and a second pump and a second motor for operably controlling a second traction mechanism of the front traction mechanism; and a secondary steering system for operably controlling a first rear wheel and a second rear wheel, the secondary steering system comprising a first actuator for controlling a steer position of the first rear wheel and a second actuator for controlling a steer position of the second rear wheel;

wherein, the controller outputs a first control signal to operably control the primary differential steering system based on the steer command;

further wherein, the controller outputs a second control signal to operably actuate the first and second actuators based on a selected non-linear steering gain curve from the plurality of non- linear steering gain curves.

21. The steering system of claim 20, wherein:

the steer command comprises at least a steering wheel rate;

the first control signal corresponds to a first non-linear gain curve;

the first non-linear gain curve and the selected non-linear steering gain curve provide overlapping gain values at a low steering wheel rate; and the selected non-linear steering gain curve providing a higher gain value than the first non-linear gain curve at a high steering wheel rate.

* * * * *